(12) United States Patent
Sanada et al.

(10) Patent No.: US 7,835,423 B2
(45) Date of Patent: Nov. 16, 2010

(54) RECEIVING DEVICE TO DETERMINE THE SAMPLING RATE FOR A RECEIVED SIGNAL USING A PLURALITY OF SAMPLING RATES

(75) Inventors: Yukitoshi Sanada, Kanagawa (JP); Hideki Yokoshima, Kanagawa (JP); Masayoshi Abe, Tokyo (JP); Yuya Kondo, Kanagawa (JP)

(73) Assignee: Sony Corporation, Tokyo (JP)

( * ) Notice: Subject to any disclaimer, the term of this patent is extended or adjusted under 35 U.S.C. 154(b) by 667 days.

(21) Appl. No.: 11/780,929

(22) Filed: Jul. 20, 2007

(65) Prior Publication Data

US 2008/0025440 A1  Jan. 31, 2008

(30) Foreign Application Priority Data

Jul. 27, 2006 (JP) ............................. 2006-204824

(51) Int. Cl.
*H04B 1/00* (2006.01)
(52) U.S. Cl. ...................................................... 375/147
(58) Field of Classification Search ................. 375/147
See application file for complete search history.

(56) References Cited

U.S. PATENT DOCUMENTS

| | | | | |
|---|---|---|---|---|
| 3,862,373 A * | 1/1975 | Cohen et al. ................. | 370/299 |
| 4,755,795 A * | 7/1988 | Page ............................. | 341/51 |
| 6,211,924 B1 * | 4/2001 | Patel et al. ................... | 348/726 |
| 6,243,430 B1 * | 6/2001 | Mathe ......................... | 375/346 |
| 6,487,193 B1 | 11/2002 | Hamada et al. | |
| 7,248,189 B2 * | 7/2007 | Sinha et al. .................... | 341/61 |
| 7,480,324 B2 * | 1/2009 | Aiello et al. .................. | 375/130 |
| 7,656,970 B1 * | 2/2010 | Sankabathula et al. ...... | 375/316 |
| 2001/0050953 A1 * | 12/2001 | Kempf ......................... | 375/240 |

(Continued)

FOREIGN PATENT DOCUMENTS

JP           06-350467           12/1994

(Continued)

OTHER PUBLICATIONS

Honary, "Adaptive-Rate Sampling Applied to the Efficient Encoding of Speech Waveforms" National Conference on Telecommunications, York, Apr. 2-5, 1989, London IEE, vol. CONF 2, Apr. 2, 1989, pp. 352-357.*

(Continued)

*Primary Examiner*—Juan A Torres
(74) *Attorney, Agent, or Firm*—Finnegan, Henderson, Farabow, Garrett & Dunner L.L.P.

(57) ABSTRACT

This application discloses, among other things, a receiving device including channel signal output unit for sampling a received signal at a sampling rate switched one of in a predetermined range and between a plurality of values and outputting a channel signal, control unit for controlling the sampling rate in the channel signal output unit, response estimation unit for estimating a response based on the channel signal output by the channel signal output unit, evaluation unit for evaluating a reception characteristic based on an estimation result of the response by the response estimation unit, and determination unit for determining the sampling rate in the channel signal output unit based on an evaluation of the reception characteristic at a plurality of sampling rates by the evaluation unit.

10 Claims, 22 Drawing Sheets

U.S. PATENT DOCUMENTS

| | | | |
|---|---|---|---|
| 2002/0009161 A1* | 1/2002 | Ratni et al. | 375/316 |
| 2003/0123408 A1 | 7/2003 | Saitou | |
| 2003/0179018 A1* | 9/2003 | Ballantyne et al. | 327/91 |
| 2004/0013218 A1 | 1/2004 | Kouyama | |
| 2004/0037351 A1* | 2/2004 | Itoh | 375/149 |
| 2004/0139466 A1 | 7/2004 | Sharma et al. | |
| 2006/0010185 A1 | 1/2006 | He | |

FOREIGN PATENT DOCUMENTS

| | | |
|---|---|---|
| JP | 07-226783 | 8/1995 |
| JP | 2000-082973 | 3/2000 |
| JP | 2000-082975 | 3/2000 |
| JP | 2002-217786 | 8/2002 |
| JP | 2004-229305 | 8/2004 |
| JP | 2004-320467 | 11/2004 |
| JP | 2006-014027 | 1/2006 |
| JP | 2008-505577 | 2/2008 |

OTHER PUBLICATIONS

K. Kim, et al., "Effect of Tap Spacing on the Performance of Direct-Sequence Spread-Spectrum RAKE Receiver," IEEETrans. on Commun., vol. 48, No. 6, Jun. 2000.

C. Tepedelenlioglu, et al., "Low Complexity Multipath Diversity through Fractional Sampling in OFDM," IEEE Trans. on Signal Processing, vol. 52, No. 11, Nov. 2004.

Chunjiang, et al., "The design of 802.11b WLAN baseband processor," Proceedings. 5th International Conference on ASIC, 2003, vol. 5, pp. 852-855 Oct. 2003.

J. Mitsugi, et al., "Path-search algorithm introducing path-management tables for a DS-CDMA mobile terminal," Proceedings. The 13th Communications, vol. 2, pp. 730-734, Sep. 2002.

H. Hamada, et al., "Performance evaluation of the path search process for the W-CDMA system," Proceeding. 1999 IEEE 49th Vehicular Technology Conference, vol. 2, pp. 980-984, May 1999.

* cited by examiner

CHANNEL RESPONSE

RECEIVING DEVICE TO DETERMINE THE SAMPLING RATE FOR A RECEIVED SIGNAL USING A PLURALITY OF SAMPLING RATES

CROSS REFERENCES TO RELATED APPLICATIONS

The present invention contains subject matter related to Japanese Patent Application JP 2006-204824 filed in the Japan Patent Office on Jul. 27, 2006, the entire contents of which being incorporated herein by reference.

BACKGROUND OF THE INVENTION

1. Technical Field

The present invention relates to a receiving device, a receiving method, a program, and a recording medium, and in particular to a receiving device, a receiving method, a program, and a recording medium capable of improving the reception characteristic.

2. Related Art

In the past, in the wireless receivers, there has been proposed a fractional sampling method or a over sampling method for sampling a symbol signal a plurality of times.

For example, studies have been done on a trade-off between the sampling interval and the characteristic in the direct sequence spread spectrum (DS/SS) modulation method (see e.g., K. J. Kim, S. Y. Kwon, E. K. Hong, and K. C. Whang, "Effect of Tap Spacing on the Performance of Direct-Sequence Spread-Spectrum RAKE Receiver," IEEE Trans. on Commun., vol. 48, no. 6, June 2000), and on the effect of diversity by fractional sampling in the orthogonal frequency division multiplexing (OFDM) modulation method (see e.g., C. Tepedelenlioglu, and R. Challagulla, "Low Complexity Multipath Diversity through Fractional Sampling in OFDM," IEEE Trans. on Signal Processing, vol. 52, no. 11, November 2004), and it is obvious that the characteristic is improved by increasing the sampling rate.

Further, in the past, in the receiver of the code division multiple access (CDMA) system, a mechanism for estimating the channel response after over-sampling the received signal and then detecting the optimum despreading timing has been considered (see e.g., Tu Chunjiang, Zhou Xin, Liu Bo-an; Chen Hongyi, "The design of 802.11b WLAN baseband processor," Proceedings. 5th International Conference on ASIC, 2003, vol. 2, pp. 852-855 October 2003).

As an example of the above, a method of using, for example, sliding correlation (see e.g., US Patent Publications US 2003/0123408-A1 "CDMA Receiving Apparatus," US 2004/0139466-A1 "Finger Allocation for a Path Searcher in a Multipath Receiver," and J. Mitsugi, M. Mukai, H. Tsurumi, "Path-search algorithm introducing path-management tables for a DS-CDMA mobile terminal," Proceedings. The 13th IEEE International Symposium on Personal, Indoor and Mobile Radio Communications, Vol. 2, pp. 730-734, September 2002). FIG. 1 is a block diagram of a receiving device 1 for receiving a signal by the channel response estimation method using the sliding correlation.

The received signal is input to a sliding correlation section 11. The sliding correlation section 11 multiplies the received signal by a spread code with a certain phase $\tau$ input from a spread code generation section 12. The signal obtained by the multiplication is input to an integrator 13, integrated there for one spread code period, and supplied to a square circuit 14, thus the channel response corresponding to the phase $\tau$ is detected. Further, the output of the square circuit 14 is input to a channel response estimation section 15. The channel response estimation section 15 estimates the whole channel response corresponding to other phases than the phase $\tau$.

Further, as another example, a method using correlation can also be cited (see e.g., H. Hamada, M. Nakamura, T. Kubo, M. Minowa, Y. Oishi, "Performance evaluation of the path search process for the W-CDMA system," Proceedings. 1999 IEEE 49th vehicular Technology Conference, Vol. 2, pp. 980-984, May 1999, and US Patent Publication US 2004/0013218-A1, "Receiving Device and Receiving Method"). FIG. 2 is a block diagram showing the configuration of the receiving device 21 estimating the channel response using the correlation.

The received signal over-sampled by an analogue-to-digital (A/D) converter not shown is input to a decimeter 31, and down-sampled to have an appropriate sampling interval. The output of the decimeter 31 is input to a correlation filter 32, and a correlation process (a matched filter process) is performed thereon. If the received signal has a predetermined correlation, the output of the correlation filter 32 directly represents the channel response, and accordingly, a channel response estimation section 33 estimates the whole channel response based on the output thereof. In this method, the channel response can be estimated in a short period of time.

Further, as another method, a method using a plurality of correlators can be cited (see e.g., U.S. Pat. No. 6,487,193 "Path Searched Device and CDMA Receiver with the Same"). FIG. 3 is a block diagram showing a receiving device 41 capable of estimating a detailed channel response, only when necessary, using two correlation filters.

The received signal is input to the decimeter 51. The decimeter 51 performs decimation on the received signal thus input thereto at two decimation rates, and outputs the decimation output at the higher decimation rate (a lower over-sampling order) to the correlation filter 52 while outputting the decimation output at the lower decimation rate (a higher over-sampling order) to the correlation filter 53. Further, it is arranged to be able to estimate a detailed channel response according to needs by estimating a rough channel response by the correlation filter 52, and then operating the correlation filter 53 with an only necessary delay utilizing the result of the rough channel response estimation. Then, the channel response estimation section 54 estimates the whole channel response based on the results.

It should be noted that these technologies explained with reference to FIGS. 1 through 3 are all for detecting the maximum value of an impulse response in one chip, but not for detecting more than one sample per chip.

SUMMARY

It is obvious from the studies in the past that the characteristic is improved by increasing the sampling rate. However, when the fractional sampling is performed, for example, requirement of increasing the operation speed of the circuit in accordance with the order arises, which increases the power consumption. Further, if parallel signal processing is used, the mounting area of the circuit increases, thus increasing the cost.

Even though the characteristic is improved, increase in power consumption, increase in the mounting area of the circuit, and increase in cost are not preferable for wireless terminals in any cases.

In consideration of the above circumstances, it is preferable to make it possible to improve the reception characteristic while preventing increase in power consumption, increase in the mounting area of the circuit, and increase in cost.

According to an embodiment of the invention there is provided a receiving device including channel signal output means for sampling a received signal at a sampling rate switched one of in a predetermined range and between a plurality of values and outputting a channel signal, control means for controlling the sampling rate in the channel signal output means, response estimation means for estimating a response based on the channel signal output by the channel signal output means, evaluation means for evaluating a reception characteristic based on an estimation result of the response by the response estimation means, and determination means for determining the sampling rate in the channel signal output means based on an evaluation of the reception characteristic at a plurality of sampling rates by the evaluation means.

In a period for receiving auxiliary information prior to receiving principal information, the auxiliary information being necessary for receiving the principal information, it is possible that the control means controls the sampling rate in the channel signal output means to allow the response estimation means to estimate responses at a plurality of sampling rates, the response estimation means estimates responses at the plurality of sampling rates, the evaluation means evaluates reception characteristics at the plurality of sampling rates, and the determination means determines a practical sampling rate for sampling a signal corresponding to the principal information in the channel signal output means based on the evaluation of the reception characteristics at the plurality of sampling rates by the evaluation means. Further, in a period for receiving the principal information, it is possible that the control means controls the sampling rate in the channel signal output means to be the practical sampling rate.

In sampling the received signal in the channel signal output means, sampling points can be different from each other among the plurality of sampling rates.

The channel signal output means can include A/D conversion means for over-sampling the received signal and converting into a digital signal, and rate conversion means for converting a rate of the digital signal obtained by converted by the A/D conversion means and outputting the channel signal with the sampling rate controlled by the control means.

It is possible to further include demodulation means for demodulating the received signal based on the response estimated by the response estimation means.

It is possible to further include combination control means for controlling the number of fingers and a tap coefficient of a RAKE combination based on the response estimated by the response estimation means.

It is possible to further include combination control means for controlling a diversity combining coefficient based on the response estimated by the response estimation means.

According to another embodiment of the invention there is provided a receiving method for a receiving device for receiving a signal, the receiving method including the steps of, prior to receiving principal information, and in a period for receiving a signal corresponding to auxiliary information necessary for receiving the principal information, sampling the signal corresponding to the auxiliary information at a sampling rate controlled so that an estimation of responses at a plurality of sampling rates is allowed, estimating responses at the plurality of sampling rates, evaluating reception characteristics at the plurality of sampling rates based on the estimated responses, determining a practical sampling rate for sampling a signal corresponding to the principal information based on the evaluation of the reception characteristics at the plurality of sampling rates, in a period for receiving the signal corresponding to the principal information, controlling the sampling rate for sampling the signal corresponding to the principal information to be the practical sampling rate, and sampling the signal corresponding to the principal information at the practical sampling rate.

According to still another embodiment of the invention, there are provided a computer executable program and a recording medium recording the computer executable program in a computer readable manner, the computer executable program allowing a computer to control a process of a received signal, the process including the steps of controlling a sampling rate to allow an estimation of responses at a plurality of sampling rates estimating responses at the plurality of sampling rates, evaluating reception characteristics at the plurality of sampling rates based on the estimated responses, determining a practical sampling rate for sampling a signal corresponding to the principal information based on the evaluation of the reception characteristics at the plurality of sampling rates, controlling the sampling rate for sampling the signal corresponding to the principal information to be the practical sampling rate.

According to the embodiment of the invention, a sampling rate for sampling a received signal is controlled to allow an estimation of responses at a plurality of sampling rates, responses at the plurality of sampling rates are estimated, reception characteristics at the plurality of sampling rates based on the estimated responses are evaluated, a practical sampling rate for sampling a signal corresponding to the principal information is determined based on the evaluation of the reception characteristics at the plurality of sampling rates, and, the sampling rate for sampling the signal corresponding to the principal information is controlled to be the practical sampling rate.

A network denotes a configuration arranged to connect at least two devices so as to transmit information from one of the devices to the other of the devices. The devices communicating via the network can be independent from each other or can be internal blocks composing an integrated device.

Further, communication obviously includes wireless communication and cable communication, and can be a mixture of wireless communication and cable communication, namely the case in which wireless communication is performed in one zone and cable communication is performed in the other zone. Further, the communication includes the case in which wireless communication is performed from one device to the other device and cable communication is performed from the other device to the one device.

The receiving device can be an independent or stand-alone device, or can be a block in charge of receiving process included in a transmission/reception device.

According to the embodiment of the invention, a signal can be received, in particular, since the sampling rate with a preferable reception characteristic can be selected from a plurality of sampling rates to control the sampling rate in receiving a signal, the reception characteristic can be improved while suppressing increase in poser consumption and the circuit mounting area and rising of cost.

DESCRIPTION OF THE EMBODIMENTS

A receiver applying the invention is configured including, for example, A/D converters for over-sampling one symbol, channel filters capable of changing the order of the over-sampling, a channel response estimator, and a signal processing section for performing a combination process and a demodulation process.

The signal received by an antenna is, for example, passes through a bandpass filter and an amplifier, and is distributed by a distributor, and respectively input to the two A/D converters provided corresponding to I-phase (inphase component) signal and Q-phase (quadrature component) signal. These two A/D converters over-sample one symbol. Then, the signals thus over-sampled are supplied to two channel filters corresponding respectively to the I-phase signal and the Q-phase signal, thus the alias component of the received signal is extracted. Further, the channel response is estimated from the outputs of the two filters, and the demodulation process is performed based on the estimation result.

As described above, it is obvious that the characteristic is improved by increasing the sampling rate. However, when the fractional sampling is performed, for example, requirement of increasing the operation speed of the circuit in accordance with the order arises, which increases the power consumption. Further, if parallel signal processing is used, the mounting area of the circuit increases, thus increasing the cost.

Therefore, it is required to make the reception characteristic preferable while preventing increase in power consumption and cost.

Therefore, in this receiver, it is arranged that a fixed value is not used as the sampling rate in the channel filter output, but the sampling rate in the channel filter output can be variable. In the present receiver, it is arranged that which one of the settable sampling rate makes the reception characteristic preferable if the sampling rate is set as the sampling rate in the channel filter output is judged based on the channel response, and the sampling rate with preferable reception characteristic is set to perform the communications.

It should be noted that the reception characteristic can preferably be improved in the case in which the settable sampling rates are different from each other in sampling points.

Hereinafter, embodiments of the present invention will be described with reference to the accompanying drawings.

Figure 1:
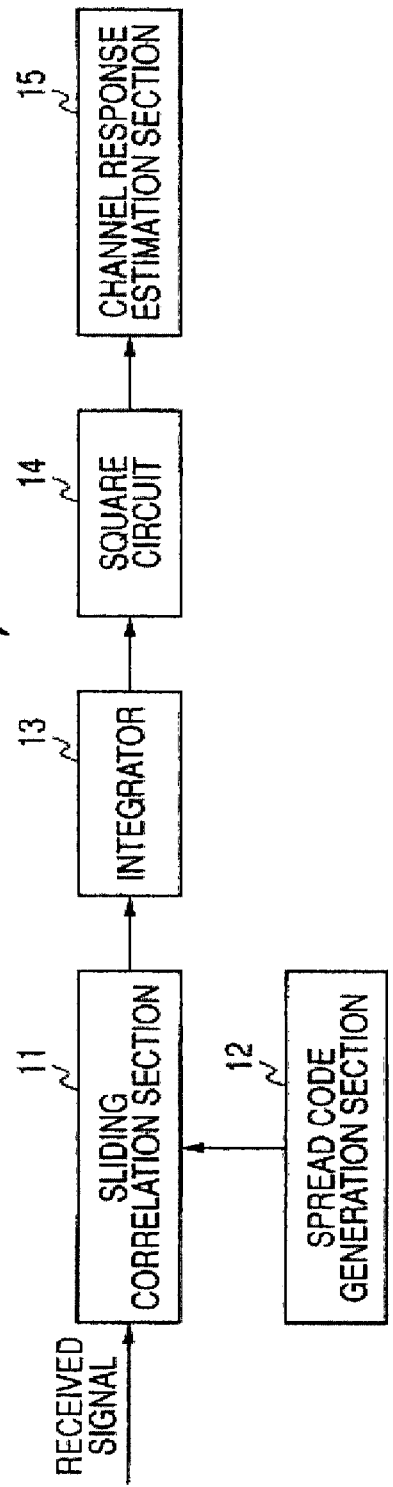
FIG. 1 is a block diagram showing a configuration of a receiving device in the past.
Figure 2:
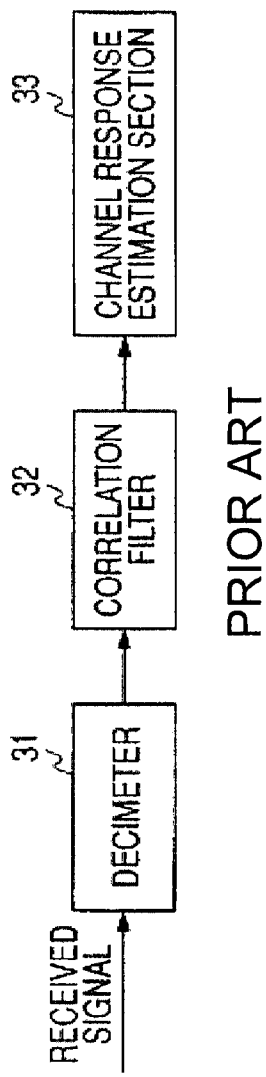
FIG. 2 is a block diagram showing a configuration of another receiving device in the past.
Figure 3:
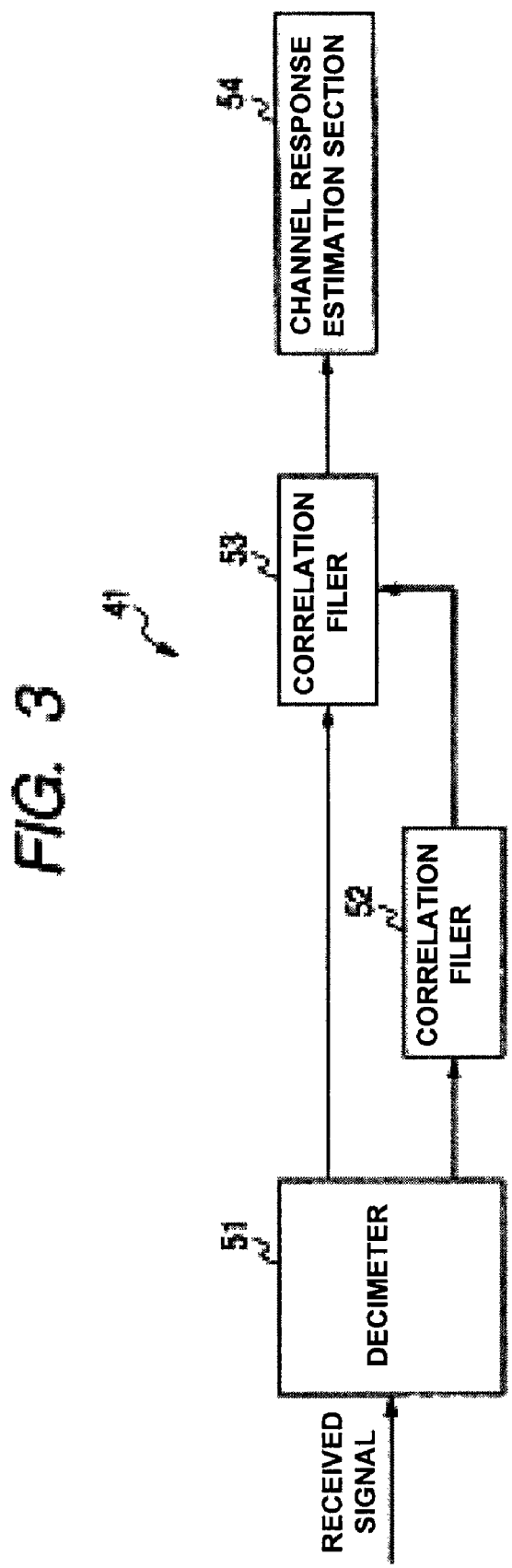
FIG. 3 is a block diagram showing a configuration of another receiving device in the past.
Figure 4:
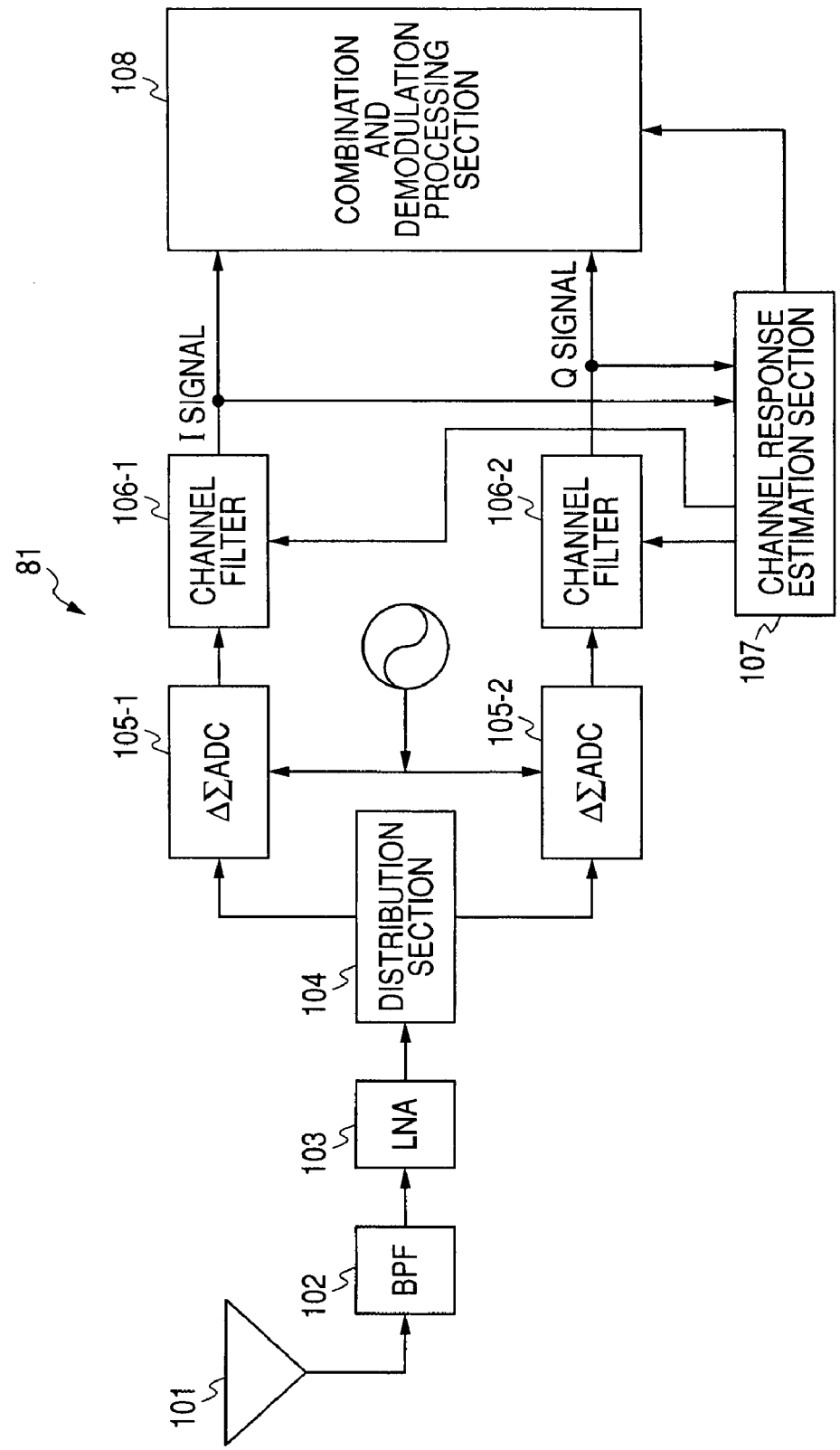
FIG. 4 is a block diagram showing a configuration of a receiving device applying the invention.

FIG. 4 is a block diagram showing the configuration of the receiving device 81, which is arranged to be able to switch the sampling rate.

The signal received by an antenna 101 is supplied to a bandpass filter (BPF) 102, and the bandpass filter 102 filters out the signal with other frequency band than the predetermined one. A low noise amplifier (LNA) 103 amplifies the RF signal supplied thereto with low noise. A distribution section 104 distributes the RF signal thus amplified to supply the to a $\Delta\Sigma$A/D conversion section 105-1 and a $\Delta\Sigma$A/D conversion section 105-2.

The $\Delta\Sigma$A/D conversion section 105-1 and the $\Delta\Sigma$A/D conversion section 105-2 convert the RF signals thus supplied into bit train with one bit width, and performs high-order over-sampling. The signals thus over-sampled are supplied to channel filters 106-1 and 106-2, respectively.

The channel filters 106-1 and 106-2 adjust the sampling rate before demodulation, perform filtering, and extract the alias components of the received signals. In this case, the channel filters 106-1 and 106-2 adjust (change the orders of the over-sampling) the sampling rates under the control of the channel response estimation section 107. In the channel filters 106-1 and 106-2, it is possible that a plurality of settable sampling rates are previously defined, and either one of the sampling rates are selected in accordance with the control of the channel response estimation section 107, or it is also possible that it is arranged to be able to take any sampling rates within a predetermined range, and the setting is tuned to be some sampling rate within the predetermined range in accordance with the control of the channel response estimation section 107. Adjustment of the sampling rate will be described later.

Then, the I signal (inphase component) output from the channel filter 106-1 and Q signal (quadrature component) output from the channel filter 106-2 are respectively input to the combination and demodulation processing section 108 and the channel response estimation section 107.

It should be noted that in the following explanations, in the case in which there is no need for distinguishing the $\Delta\Sigma$A/D conversion section 105-1 and the $\Delta\Sigma$A/D conversion section 105-2 from each other, they are collectively denoted with simply $\Delta\Sigma$A/D conversion sections 105, and in the case in which there is no need for distinguishing the channel filter 106-1 and the channel filter 106-2 from each other, they are collectively denoted with simply channel filters 106.

Subsequently, the channel response estimation section 107 estimates the channel response from the outputs of the channel filters 106-1 and 106-2. Then, the channel response estimation section 107 changes the order of the over-sampling in the channel filters 106-1 and 106-2 based on the estimation result of the channel response. Further, the channel response estimation section 107 supplies the combination and demodulation processing section 108 with control signals for controlling the process such as diversity combination or RAKE combination. The combination and demodulation processing section 108 combines the signals thus over-sampled by a predetermined method suitable to the type of the received signal and then demodulates it. The function the channel response estimation section 107 has will be described later with reference to FIG. 6.

It should be noted that although the ΔΣA/D conversion sections 105 are used for analog-to-digital conversion in FIG. 4, an A/D conversion sections performing the A/D conversion process of other methods than the ΔΣA/D conversion can also be used. Further, although the configuration in which the over-sampling is previously performed in the A/D conversion process, and the sampling rate before demodulation is adjusted in the channel filters 106 is adopted here, it is possible that the sampling rate is adjusted in the A/D conversion process. or, as widely appeared in the past, after performing frequency conversion by a mixer, A/D conversion is performed, and the sampling rate can be adjusted in the A/D conversion process.

In other words, in FIG. 4, although the configuration in which the ΔΣA/D conversion sections 105 are used for the analog-to-digital conversion, and the sampling rate before demodulation is adjusted by the channel filters 106 is adopted, other configurations can be taken as long as it has a function of obtaining the analog received signal, and converting the signal into a digital signal with a plurality of predetermined sampling rates or a sampling rate in a predetermined range in accordance with the control of the channel response estimation section 107.

Then, adjustment of the sampling rate by the channel filters 106 will be explained.

In the case in which the sampling rate of the signal input thereto is converted into a desired sampling rate, a method of once performing up-sampling with a clock achieving the least common multiple between the two clocks and then performing down-sampling after making the signal pass through the aliasing removing filter is generally taken (described in, e.g., P. P. VAIDYANATHAN, "Multirate systems and filter banks," PRENTICE-HALLPTR).

However, if such a method is taken, since the frequency of the clock achieving the least common multiple becomes high depending on the respective sampling rates, considering the implementation of the digital filter in the subsequent stage, in some cases, it is not practicable on the power consumption and the mounting area front.

Further, for example, in the case of converting the frequency Fs of the input sample into 1.5 Fs, when two samples of signals are input, three samples of signals need to be output, therefore, one sample of output needs to be complemented with some other data. This means that aliasing is generated every period of 1.5 Fs×1/3=0.5 Fs, and, by using the data at the previous timing as the data to be inserted, it becomes possible to add the SINC filter property (moving-average filter property) to the generated aliasing signal, and accordingly, the aliasing signal can be attenuated. Further, by adding 1.5 Fs in every two samples, the SINC filter property can be realized, the aliasing component interfering in the decimation can be attenuated. Although the symbol is influenced by the aliasing if the decimation is further performed on the symbol thus obtained, it causes no problem if the aliasing signal is attenuated by the SINC filter to the allowable range, further, if the desired signal is a narrow band signal and the aliasing signal does not interfere in that frequency band, the influence thereof can be eased by the posterior digital filter.

Such a system becomes equivalent to what is provided with dual SINC filter, and accordingly, the mounting cost becomes very low. However, by limiting the anti-aliasing filter to SINC filter, problems arise that the attenuation amount of the aliasing is insufficient, that the amplitude in the desired frequency band is attenuated, and that the consideration of degradation in the characteristic becomes necessary. In order for minimizing such influences, it is preferable that the highest possible frequency is used for re-sampling, and the frequency range for conversion is set at least higher than the desired frequency band. Thus, the aliasing does not caused inside the desired frequency range, and these aliasing signals can further be attenuated using the posterior digital filter. Further, by thus arranged, since the notch frequency of the first-stage SINC filter becomes high, the attenuation amount in the desired frequency band becomes small.

By using this method, the mounting cost of the channel filters 106 for performing the sampling rate conversion can be reduced. However, since in such a configuration the required operational speed for the anterior digital filter is increased, the power consumption dramatically increases.

Figure 5:
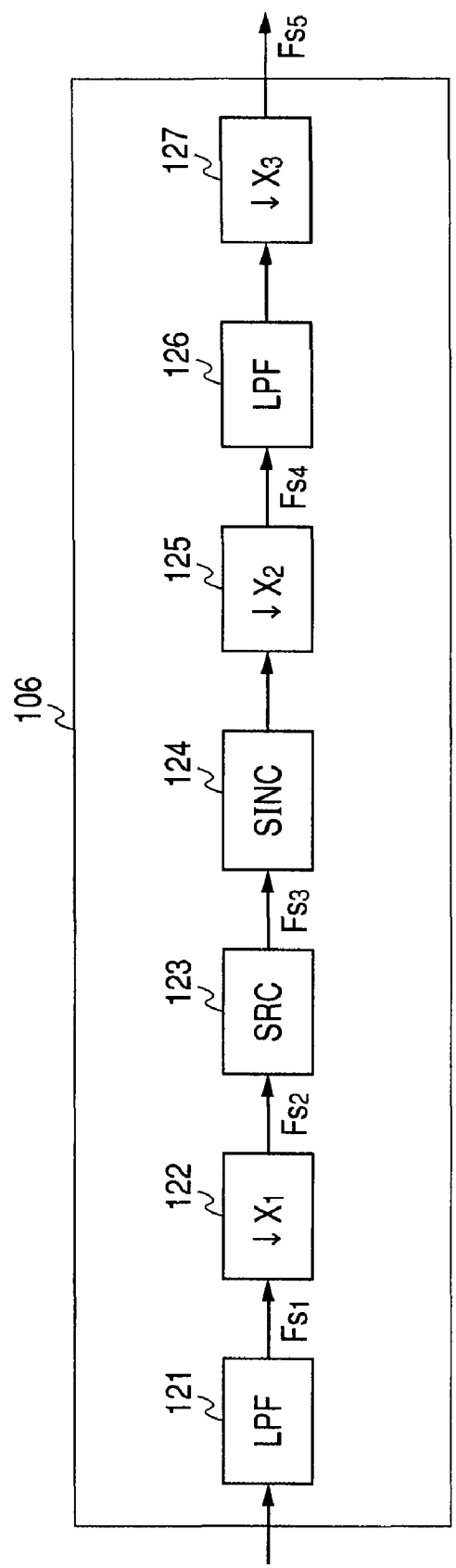
FIG. 5 is a block diagram showing a configuration of a channel filter shown in FIG. 4.

In order for solving the problem, it is also possible to arrange the configuration of the channel filter 106 as shown in FIG. 5, for example.

A low-pass filter (LPF) 121 filters out the signal with high frequency component higher than a predetermined frequency band. A decimeter 122 is for decreasing the sampling rate of the supplied signal at a predetermined rate $X_1$ (multiplied by $1/X_1$), and since the input signal with a sampling rate $Fs_1$ is picked up and output at predetermined timing, the sampling points of the output signal with a predetermined sampling rate $Fs_2$ are determined by the timing of picking up the signal.

In the sampling rate $Fs_2$ of the input signal and the sampling rate $Fs_3$ of the output signal, a sampling rate converter (SRC) 123 performs a process for complementing with the data obtained at the previous timing at a rate of one sample out of $Fs_2/(Fs_3-Fs_2)$ samples.

An SINC filter 124 performs a moving-average calculation. It should be noted that the SINC filter 124 can be eliminated depending on the required error vector magnitude (EVM) characteristic. In general, the EVM characteristic required in BPSK and QPSK is roughly EVM<−20 dB, and the EVM characteristic required in 16 QAM and 64 QAM is about EVM<−30 dB. In consideration of such requested specifications, in BPSK, QPSK, the characteristic without the SINC filter is sufficient.

Further, a decimeter 125 is for decreasing the sampling rate of the supplied signal at a predetermined rate $X_2$ (multiplied by $1/X_2$), and since the input signal with a sampling rate $Fs_3$ is picked up and output at predetermined timing, the sampling points of the output signal with a predetermined sampling rate $Fs_4$ are determined by the timing of picking up the signal. An LPF 126 filters out the signal with high frequency component higher than a predetermined frequency band. A decimeter 127 is for decreasing the sampling rate of the supplied signal at a predetermined rate $X_3$ (multiplied by $1/X_3$), and since the input signal with a sampling rate $Fs_4$ is picked up and output at predetermined timing, the sampling points of the output signal with a sampling rate $Fs_5$ required in the posterior system are determined by the timing of picking up the signal.

In other words, it is arranged that in the channel filter 106, by appropriately setting the rates of the decimation and the sampling points in the decimeters 122, 125, and 127, and the conversion coefficient of the sampling rate (generation rate of the complemented signal) in the sampling rate converter 123, it is possible to convert the output of the ΔΣA/D conversion sections 105 into a signal at a predetermined sampling point with a predetermined sampling rate, thus performing filtering.

Figure 6:
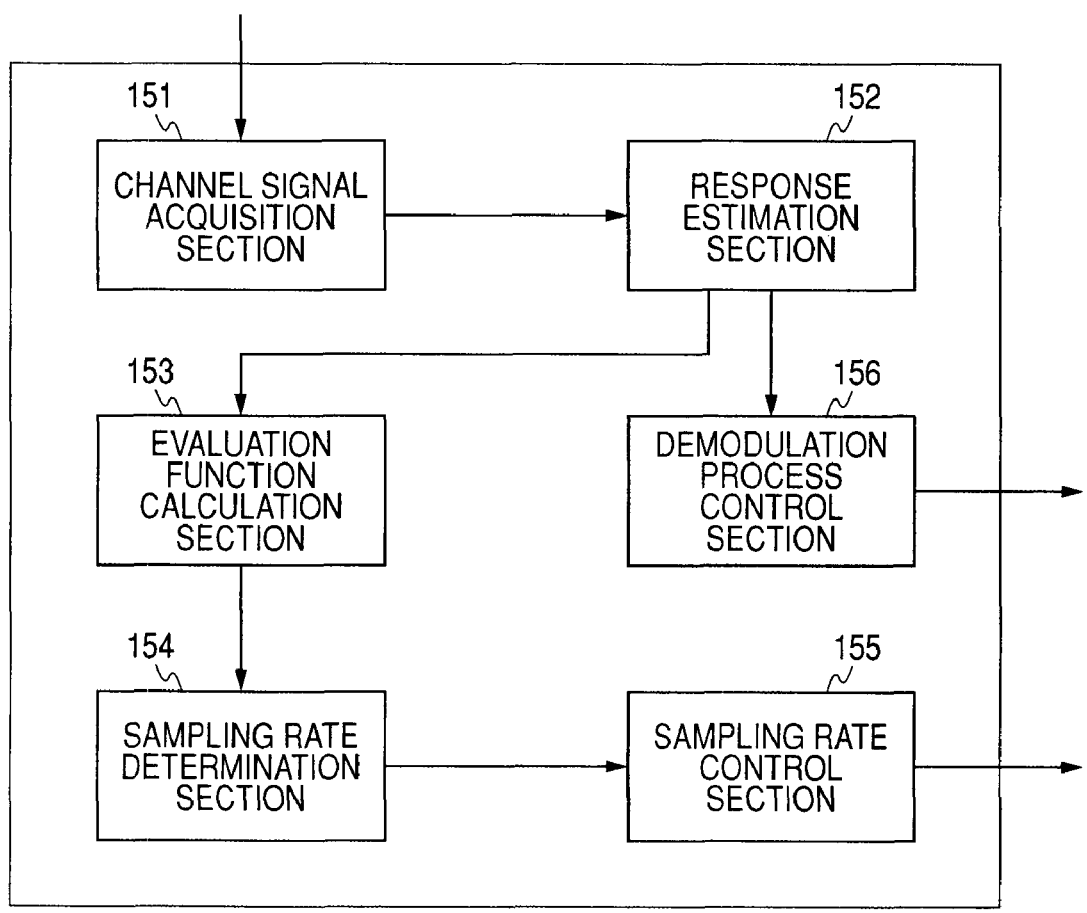
FIG. 6 is a functional block diagram showing the function of a channel response estimation section shown in FIG. 4.

FIG. 6 is a functional block diagram showing functions the channel response estimation section 107 has. In other words, the channel response estimation section 107 has functions represented by a channel signal acquisition section 151, a response estimation section 152, an evaluation function calculation section 153, a sampling rate determination section 154, a sampling rate setting section 155, and a demodulation process control section 156.

The channel signal acquisition section 151 acquires channel signals obtained from the channel filters 106.

The response estimation section 152 estimates the response based on the channel signals acquired by the channel signal acquisition section 151. The detailed process for response estimation will be described later.

Prior to the communication of actually valid data, namely prior to the transmission of the live data, the evaluation function calculation section 153 evaluates the reception, utilizing, for example, an interval in which the sync signal, a spread code, and so on are transmitted, based on the reception response of the sync signal and the spread code transmitted in the interval, and in order for determining the most effective sampling rate. Specifically, the evaluation function calculation section 153 performs operation of a predetermined evaluation function for evaluating the reception characteristic.

Prior to the transmission of the actually valid data, for example, in the interval in which the sync signal, the spread code, and so on are transmitted, the sampling rate determination section 154 controls the sampling rate setting section 155 to perform the reception process capable of obtaining the responses at a plurality of sampling rates, and determines the effective sampling rate (the sampling points if necessary) for receiving the data based on the results of operation of the evaluation function by the evaluation function calculation section 153 based on the responses obtained at respective sampling rates.

As described above, in the channel filters 106, it is possible that a plurality of settable sampling rates and the sampling points in the respective sampling rates are previously defined, and either one of the sampling rates are selected in accordance with the control of the channel response estimation section 107, or it is also possible that it is arranged to be able to take any sampling rates and the sampling points within a predetermined range, and the setting is tuned to be some sampling rate and some sampling points within the predetermined range in accordance with the control of the channel response estimation section 107.

Prior to the actually valid data communication, the sampling rate determination section 154 controls the sampling rate setting section 155 to perform the reception processes at a plurality of sampling rates and sampling points, which are previously made settable, or at a plurality of sampling rates and sampling points within a predetermined range, and determines the most suitable sampling rate (and sampling points if necessary) in accordance with the evaluation function.

Based on the control of the sampling rate determination section 154, the sampling rate setting section 155 sets the sampling rate and the sampling points in the channel filters 106.

The demodulation process control section 156 determines coefficients necessary for the combination process and the demodulation process in the combination and demodulation processing section 108 such as the number of fingers and the tap coefficient for the RAKE combination in receiving the DS/SS signal, or the diversity combination coefficient in receiving the OFDM signal, and controls the process.

Then, as a specific example of actual response estimation, the estimation of the response and determination of the sampling rate in the case of receiving the DS/SS signal and in the case of receiving the OFDM signal will hereinafter be described.

Firstly, the estimation of response and determination of the sampling rate in the case in which the receiving device 81 receives the DS/SS signal will be explained.

In the header of the packet of IEEE 802.11b, the same spread code is transmitted 128 times as a synchronizing symbol. The receiving device 81 performs a process for selecting the sampling rate within the period in which the symbol is received.

Further, here as an example, the explanation will be presented assuming that the sampling rates the channel filters 106 can take in the actual data receiving process on the output of the channel filters 106 is either one of four samples per symbol and two samples per symbol.

Figure 7:
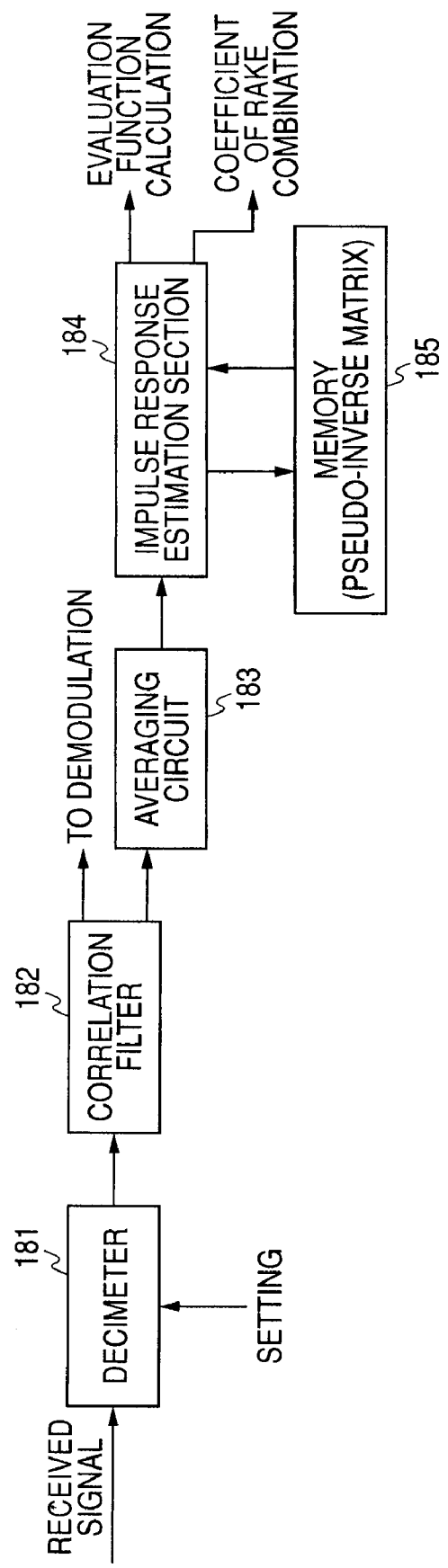
FIG. 7 is a block diagram for explaining the response estimation.

The impulse response estimation (the estimation process of the response by the response estimation section 152 shown in FIG. 6) when receiving the synchronizing symbol in the case of receiving the DS/SS signal will be explained with reference to FIG. 7.

When the decimeter 181 (e.g., the decimeter 122, the decimeter 125, and the decimeter 127 shown in FIG. 5) in the channel filter 106 is set, the sampling is performed with a predetermined sampling rate and the synchronization points (sampling points).

The sampling rate setting section 155 firstly sets the channel filters 106 so that the sampling at the respective sampling points in the available sampling rates. For example, in the case in which the sampling rates the channel filters 106 can take in the actual data reception process are four samples per symbol and two samples per symbol, if the sampling points of the two samples per symbol are included in the sampling points of the four samples per symbol, it is set so that the sampling is performed at the four samples per symbol, and if the sampling points of the four samples per symbol and the sampling points of the two samples per symbol are different from each other, it is preferably set so that the sampling is performed in each of the sampling points, namely the sampling is performed at six samples per symbol.

Further, the auto-correlation function of the spread code in the correlation filter 182 can be defined as the following formula (1).

$$r(d) = \sum_{m=0}^{MG-1} p(m)p(m+d) \tag{1}$$

Here, M denotes the length of spread code, G denotes the number of samples per chip (the order of the over-sampling), p(m) denotes the spread code waveform of the mth sample, and d denotes the phase difference of the auto-correlation function. Further, the cross-correlation matrix is defined by formula (2), and r in the formula (2) is represented by formula (3).

$$R = r \cdot r^H \quad (2)$$

$$r = [r(0), r(1), \ldots, r(D-1)]^T \quad (3)$$

Here, D denotes the number of samples corresponding to the maximum delay of the impulse response, T denotes transposition, H denotes complex conjugate transposition.

Further, the output of an averaging circuit 183 is shown in the following formula (4).

$$x = [x(0), x(1), \ldots, x(D-1)]^T \quad (4)$$

Here, x(d) denotes the output of the averaging circuit corresponding to the dth sample of the spread code.

Further, the impulse response matrix of the channel is shown in the following formula (5).

$$c = [c(0), c(1), \ldots, c(D-1)] \quad (5)$$

In the formula (5), c(d) denotes the impulse response corresponding to the delay of the dth sample.

A memory 185 stores the pseudo-inverse matrix $R^+$ of the cross-correlation matrix R. An impulse response estimation section 184 estimates the impulse response of the channel as shown in the following formula (6) using the pseudo-inverse matrix $R^+$ of the R stored in the memory 185.

$$c = R^+ x \quad (6)$$

Here, singular value decomposition of the correlation matrix R is performed. Assuming that the following formula (7) is satisfied, the formula (8) is obtained from the singular values $\sigma_1, \ldots, \sigma_q$ of the R.

$$R = U\Sigma V^T \quad (7)$$

$$\Sigma = \text{diag}(\sigma_1, \sigma_2, \ldots, \sigma_q, 0, \ldots, 0) \; q = \text{rank}(R) \quad (8)$$

In contrast, the singular values of the pseudo-inverse matrix R+ are given as $1/\sigma_1, \ldots, 1/\sigma_q$, and by performing the singular value decomposition the formulas (9) and (10) can be obtained.

$$R^+ = U^+ \sum{}^+ V^{+T} \quad (9)$$

$$\sum{}^+ = \text{diag}\left(\frac{1}{\sigma_1}, \frac{1}{\sigma_2}, \ldots, \frac{1}{\sigma_q}, 0, \ldots, 0\right) q = \text{rank}(R^+) \quad (10)$$

In this case, if too small singular value is used for calculation of the pseudo-inverse matrix, errors become problematically large. Therefore, it is possible that a threshold value of the singular values is introduced, and the pseudo-inverse matrix is calculated assuming that the singular value equal to or less than the threshold value is zero.

In the case in which one chip is over-sampled G times more frequently, the response of the nth chip in the gth sample is given as the following formula (11).

$$h_{gG}[n] = h(nT_c + gT_s/G) \quad (11)$$

Here, Tc denotes one chip time period.

Figure 8:
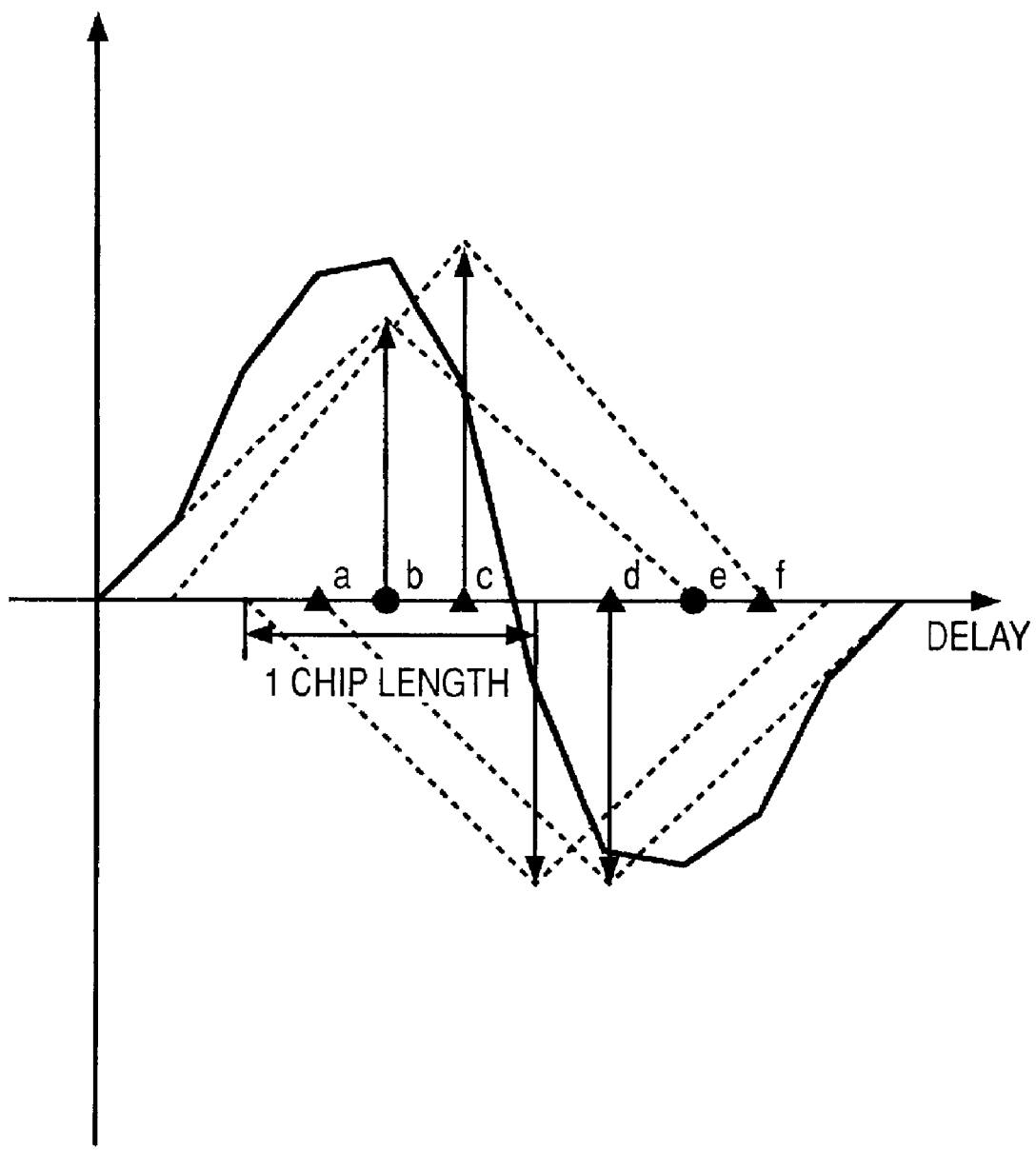
FIG. 8 is a chart showing an output example of the correlation filter in the case in which impulse responses of four pulses exist.

FIG. 8 shows the output of the correlation filter 182 in the case in which impulse responses of four pulses exist. Here, in the case in which one symbol is composed of Y chip, if one symbol includes Y samples, namely one chip includes one sample, the channel filter 106 samples at the sampling points b and e in the drawing, and if one symbol includes 2×Y samples, namely one chip includes two samples, the sampling is performed at the sampling points a, c, d, and f in the drawing.

In the method in the related art, the RAKE combination is performed by performing the sampling at one point using the maximum output of one symbol as a reference. In contrast, the sampling rate setting section 155 controls the channel filter 106 to perform sampling at sampling points b and e in the drawing when one chip includes one sample, or at sampling points a, c, d, and f in the drawing when one symbol includes four samples, namely one chip includes two samples.

Figure 9:
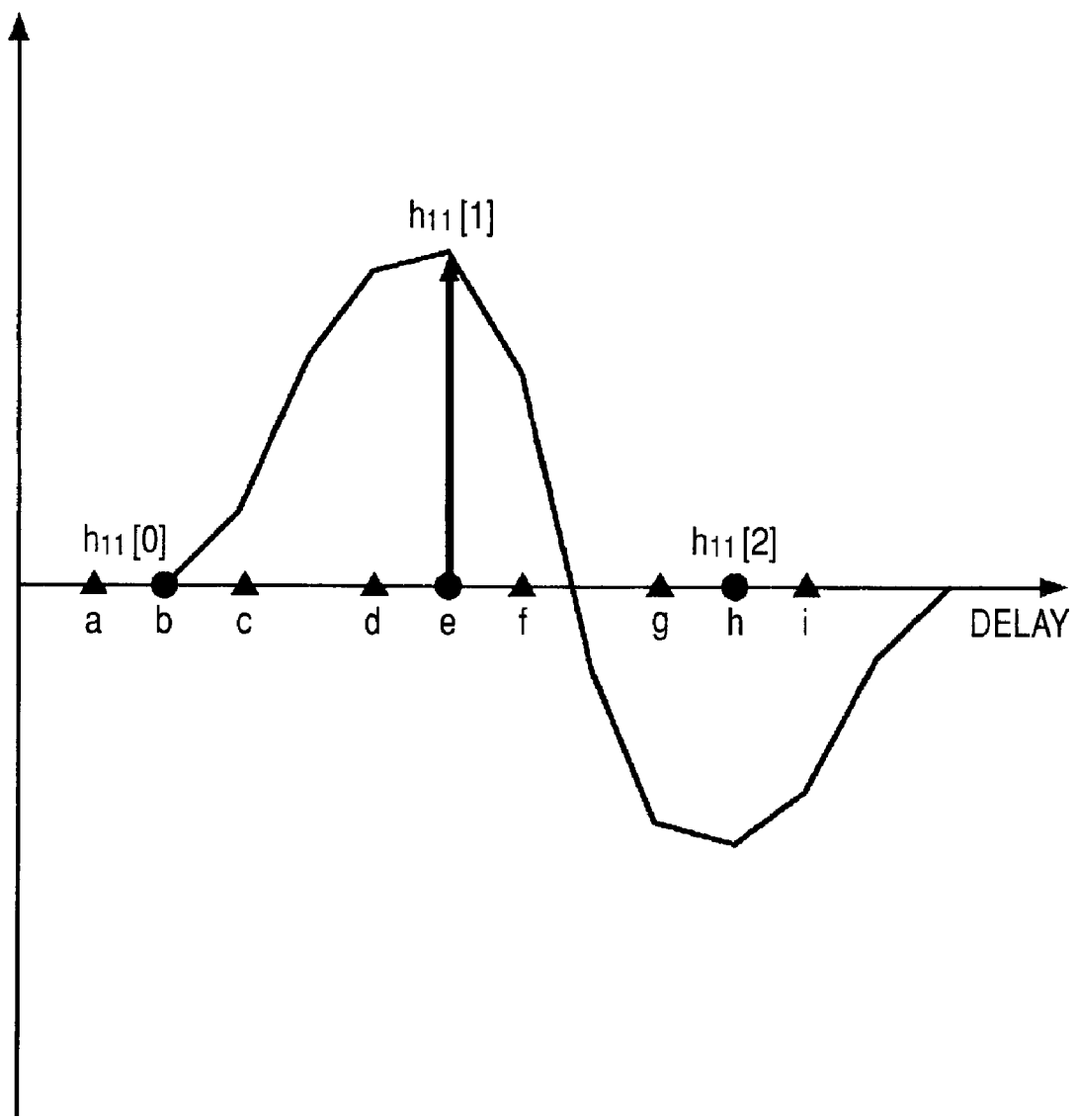
FIG. 9 is a chart for explaining an example of a sampling point at one sample per chip.
Figure 10:
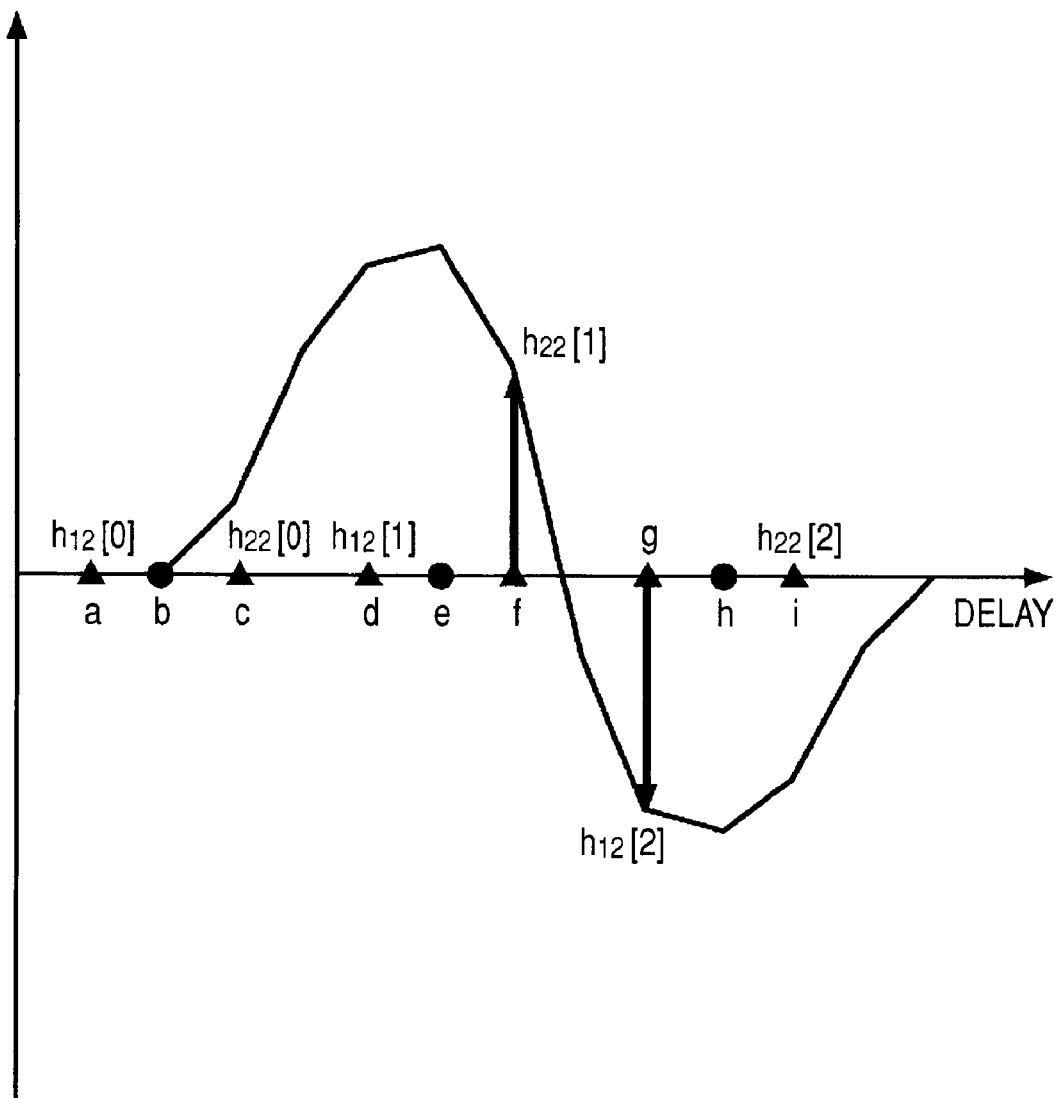
FIG. 10 is a chart for explaining an example of sampling points at two samples per chip.

For example, when one chip includes one sample, as shown in FIG. 9, the sampling is performed at the sampling points b, e, and h in the drawing to perform the RAKE combination, or when one chip includes two samples, as shown in FIG. 10, the sampling is performed at the sampling points a, c, d, f, g, and i in the drawing to perform the RAKE combination, and accordingly, more signal power can be used for demodulation in comparison with the related art case in which the sampling is performed at one sampling point b shown in the drawing using the maximum output as the reference.

As described above, the response in the case with two samples per chip and the response in the case with one sample per chip are obtained.

In the case in which the communication quality is more important than the power consumption, the evaluation function calculation section 153 operates the evaluation function shown in the following formula (12) based on the response in the case of two samples per chip and the response in the case of one sample per chip obtained by the formula (11), and performs data reception at two samples per chip if the formula (12) is satisfied, or performs data reception at one sample per chip if the formula (12) is not satisfied.

$$h_1^H R_1^{-1} h_1 < h_2^H R_2^{-1} h_2 \quad (12)$$

Here, $R_G$ denotes a covariance matrix of the noise in the correlation filter output in the case in which one chip is over-sampled G times more frequent. Further, in the formula (12), $h_1$ and $h_2$ are represented by the following formulas (13) and (14).

$$h_1 = [h_{11}[0], h_{11}[1], h_{11}[2]]^T \quad (13)$$

$$h_1 = [h_{12}[0], h_{22}[0], h_{12}[1], h_{22}[1], h_{12}[2], h_{22}[2]]^T \quad (14)$$

Further, it is obvious that in the condition in which the power consumption is more important than the communication quality (e.g., a condition of the battery capacity or the battery life), the sampling rate of the data reception is not necessarily determined by the formula (12) described above, but lower sampling rate can be selected with priority in favor of power consumption.

Further, besides which one of the communication quality and the power consumption is more important, the sampling rate determination section 154 can select the sampling rate in favor of the power consumption if, for example, a bit error rate (BER) is lower than a predetermined value, or select the sampling rate minimizing the BER if the BER is higher than a predetermined value.

It should be noted that although the explanations are presented here assuming that the sampling rate setting section 155 first sets the channel filters 106 so as to perform the sampling at respective sampling points in the available sampling rates, and the evaluation function calculation section 153 compares the evaluation functions at respective available sampling rates based on the plural responses thus obtained, it is obvious that it is possible that the sampling rate setting section 155 performs the sampling at a first available sampling rate, then the evaluation function calculation section 153 operates the evaluation function in the case with the first sampling rate based on the obtained response, then the sampling rate setting section 155 performs sampling at a second available sampling rate, then the evaluation function calculation section 153 operates the evaluation function at the second sampling rate based on the response thus obtained, and similarly the sampling rate setting section 155 sequentially performs at the available sampling rates while the evaluation function calculation section 153 operates the evaluation function of respective cases, and then performs the comparison using the operated evaluation function, thus determining the sampling rate.

Subsequently, the response estimation process and the sampling rate determination process in the case of receiving the OFDM signal will be explained.

Figure 11:
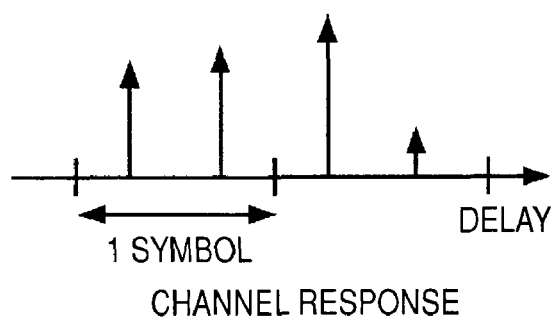
FIG. 11 is a chart for explaining an example of a channel response.
Figure 12A:
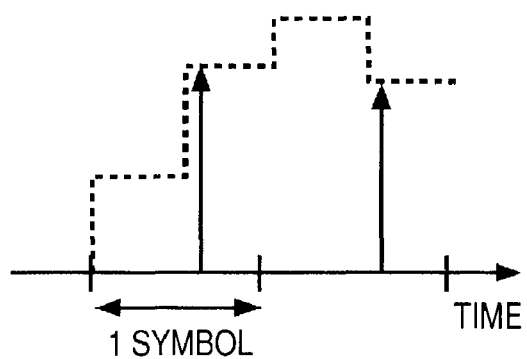
FIGS. 12A and 12B are charts for explaining the frequency characteristic at one sample per symbol.
Figure 12B:
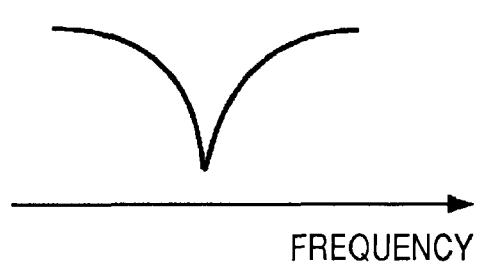
Figure 13A:
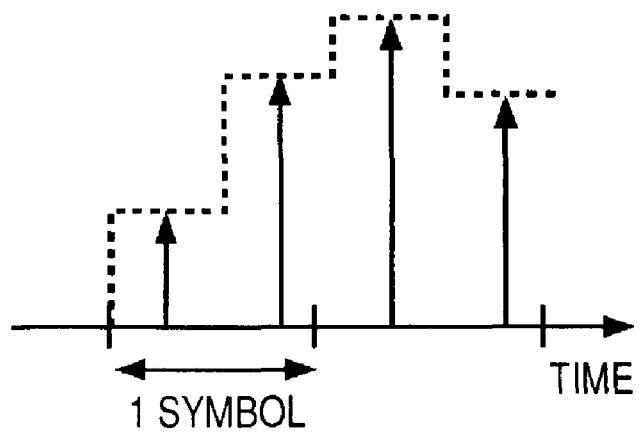
FIGS. 13A through 13C are charts for explaining the frequency characteristic at two samples per symbol.
Figure 13B:
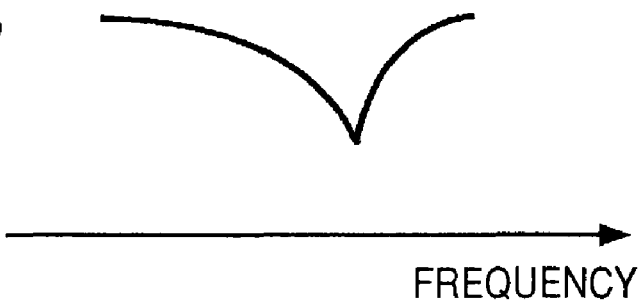
Figure 13C:
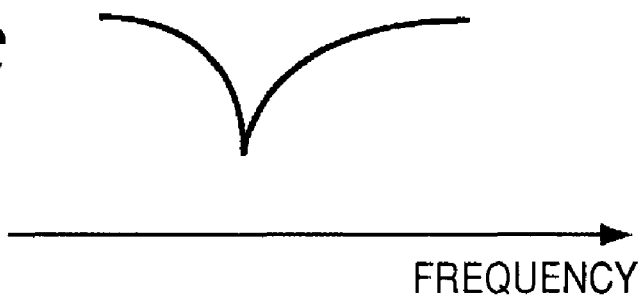

As is the case with the pilot signal of the OFDM modulation method, in the case in which an important signal is received at a specific frequency, it is also effective to adaptively change the sampling rate. For example, a channel response shown in FIG. 11 is assumed. By receiving the signal passing through such a channel at one sample per symbol as shown in FIG. 12A, the frequency characteristic shown in FIG. 12B is obtained. On the other hand, if the signal is received at two samples per symbol as shown in FIG. 13A, drops of signal intensity occur at different frequencies as shown in FIGS. 13B and 13C. Further, in some cases, the extent of the drops of the signal intensity might be reduced.

In the header of the packet compliant to IEEE 802.11a/g, the synchronizing symbol is transmitted ten times. The sampling rate determination section 154 of the channel response estimation section 107 performs the process for selecting the sampling rate in the time period for receiving the synchronizing symbol ten times.

Further, here as an example, the explanation will be presented assuming that the sampling rates the channel filters 106 can take in the actual data receiving process is either one of two samples per symbol and one sample per symbol.

The sampling rate setting section 155 firstly sets the channel filters 106 so that the sampling at the respective sampling points in the available sampling rates. For example, in the case in which the sampling rates the channel filters 106 can take in the actual data reception process are two samples per symbol and one sample per symbol, and if the sampling point of the one sample per symbol is included in the sampling points of the two samples per symbol, it is set so that the sampling is performed at the two samples per symbol, and if the sampling points of the two samples per symbol and the sampling point of the one sample per symbol are different from each other, it is preferably set so that the sampling is performed in each of the sampling points, namely the sampling is performed at three samples per symbol.

The response estimation section 152 estimates the impulse response of the channel using the pseudo-inverse matrix in a manner similar to the case with the DS/SS signal. It should be noted that in the case with the OFDM, the time waveform of the short preamble signal is used as the pseudo-inverse matrix instead of the spread code. Further, the response estimation section 152 performs discrete Fourier transform (DFT) on the estimation value of the impulse response to calculate the frequency response.

Assuming that channel response is h(t), in the case in which one time symbol is over-sampled G times more frequently, the nth response in the gth sample is given as the following formula (15).

$$h_{gG}[b] = h(nT_s + gT_s/G) \quad (15)$$

Here, Ts denotes symbol length per unit time (one OFDM symbol length/the number of DFT points). The frequency response of the gth sample is given as the following formula (16).

$$H_{gG}[k] = \sum_{n=0}^{N-1} h_{gG}[n]\exp\left(-j\frac{2\pi k n}{N}\right) \quad (16)$$

Here, N denotes the number of subcarrier of OFDM.

The evaluation function calculation section 153 operates the evaluation function shown in the following formula (17) based on the responses obtained from the formula (15) or the formula (16).

$$z_G = \min_k H_G^H[k]\Gamma_G^{-1} H_G[k] \quad (17)$$

Here, $H_G[k]$ in the formula (17) is shown in the following formula (18), $\Gamma_G$ in the formula (17) is shown in the following formula (19), $\gamma_G[k]$ in the formula (17) is shown in the following formula (20), $\gamma_{gG}[k]$ in the formula (17) is shown in the following formula (21), and $v_{gG}[k]$ in the formula (17) is shown in the following formula (22).

$$H_G[k] = [H_{1G}[k], H_{2G}[k], \ldots, H_{GG}[k]]^T \quad (18)$$

$$\Gamma_G = E[y_G[k]y_G^H[k]] \quad (19)$$

$$\gamma_G[k] = [\gamma_{1G}[k], \gamma_{2G}[k], \ldots, \gamma_{GG}[k]]^T \quad (20)$$

$$\gamma_{gG}[k] = \frac{1}{\sqrt{N}}\sum_{n=0}^{N-1} v_{gG}[n]\exp\left(-j\frac{2\pi k n}{N}\right) \quad (21)$$

$$\gamma_{gG}[n] = v(nT_s + gT_s/G) \quad (22)$$

It should be noted that v(t) denotes the Gaussian noise after passing through a receiving filter.

Further, the evaluation function calculation section 153 judges whether or not the formula (23) is satisfied based on the operation result of the evaluation function of the formula (17), and performs data reception at two samples per symbol if the formula (23) is satisfied, or performs data reception at one sample per symbol if it is not satisfied.

$$z_2 > z_1 \quad (23)$$

In the formula (17), G denotes the number of over-sampling of per symbol, Hg[k] denotes the channel response with the subcarrier k and the gth sub-sample, hgG[n] denotes the time response of the channel at a time point (n−1)Ts+Tg, Ts denotes the symbol length, and Tg=Ts/G denotes the sub-sample length.

Figure 14:
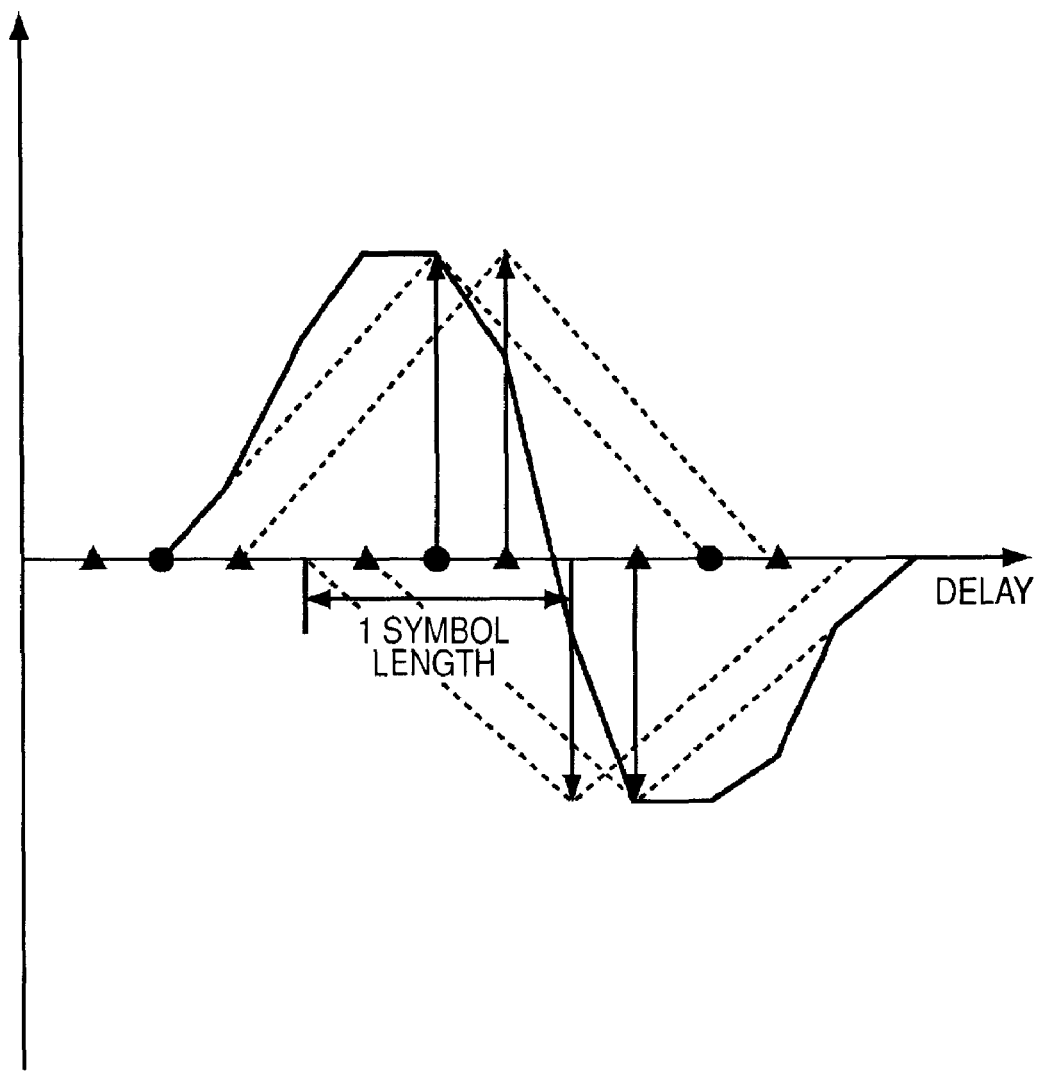
FIG. 14 is a chart for explaining an example of the channel response in the case in which the correlation waveform of the received signal pulse becomes a triangle.
Figure 15:
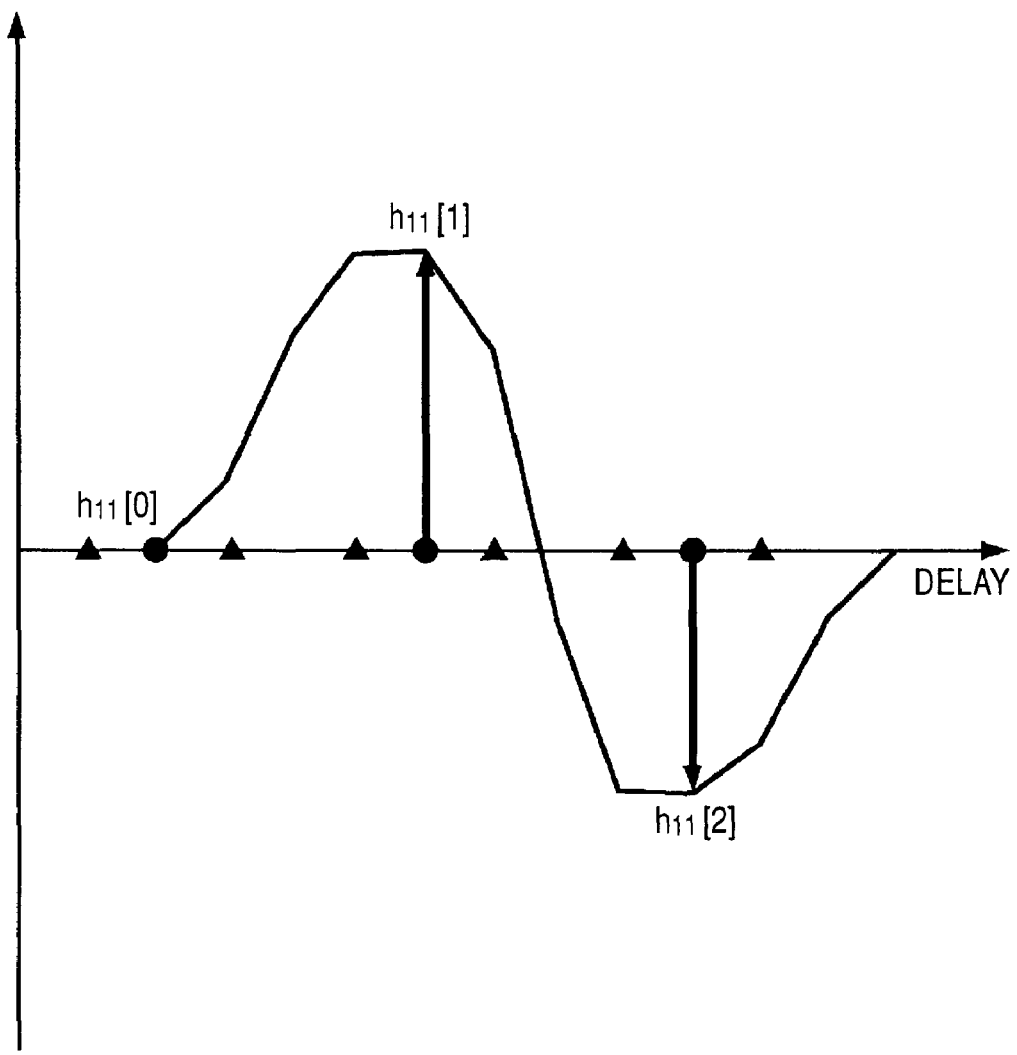
FIG. 15 is a chart showing an impulse response of a channel at one sample per symbol.
Figure 16:
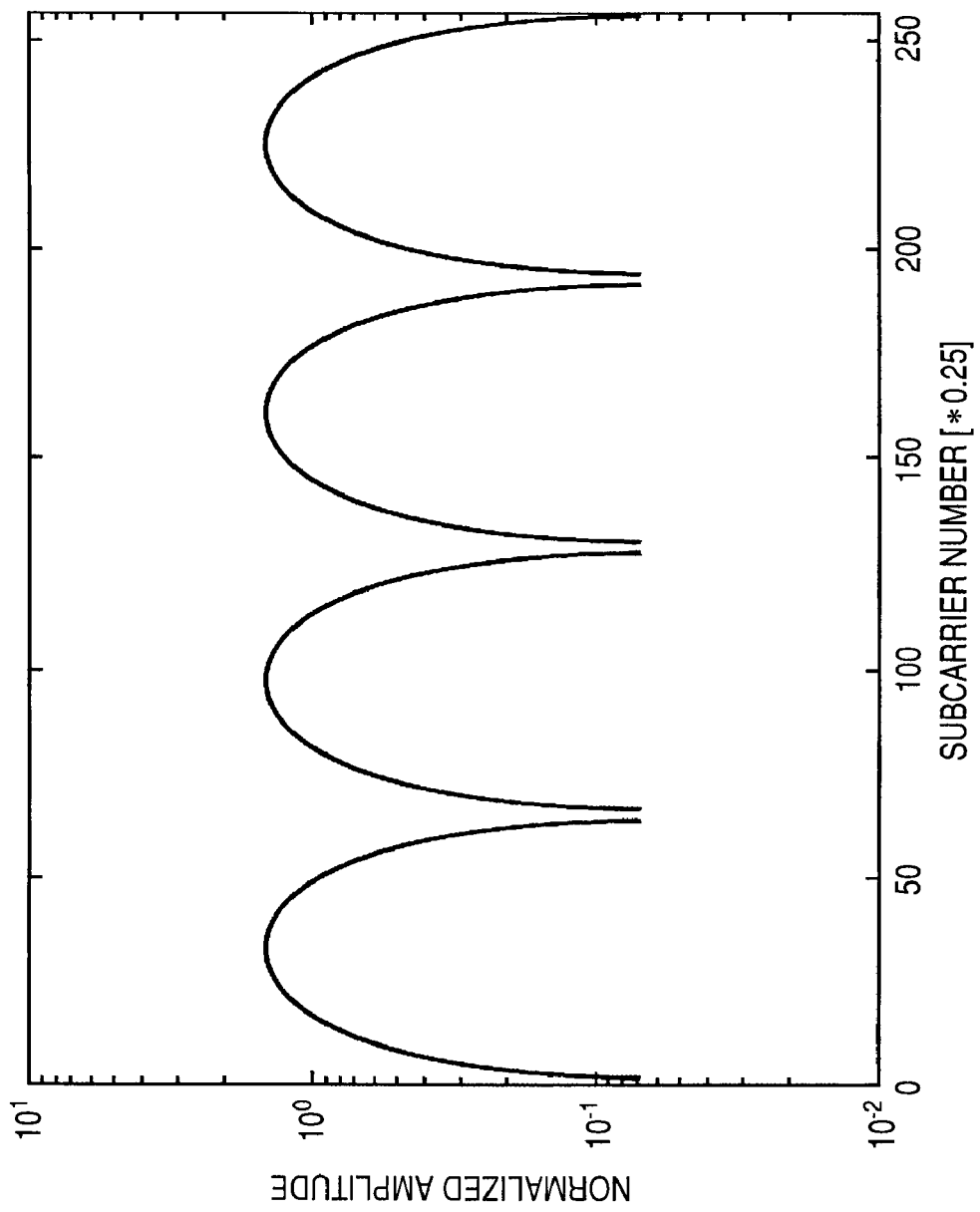
FIG. 16 is a chart showing a frequency response of the channel at one sample per symbol.
Figure 17:
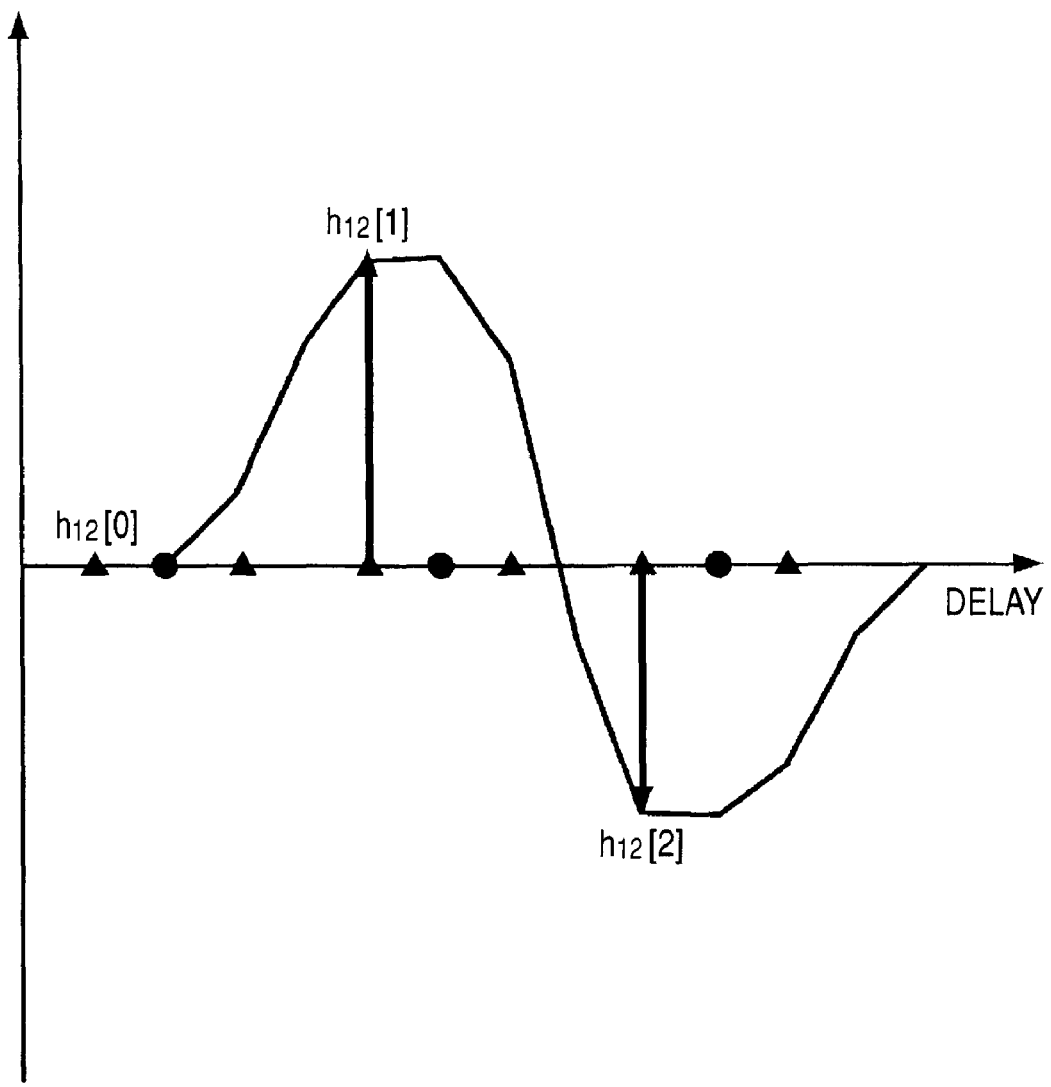
FIG. 17 is a chart showing an impulse response of the channel of the first sample at two samples per symbol.
Figure 18:
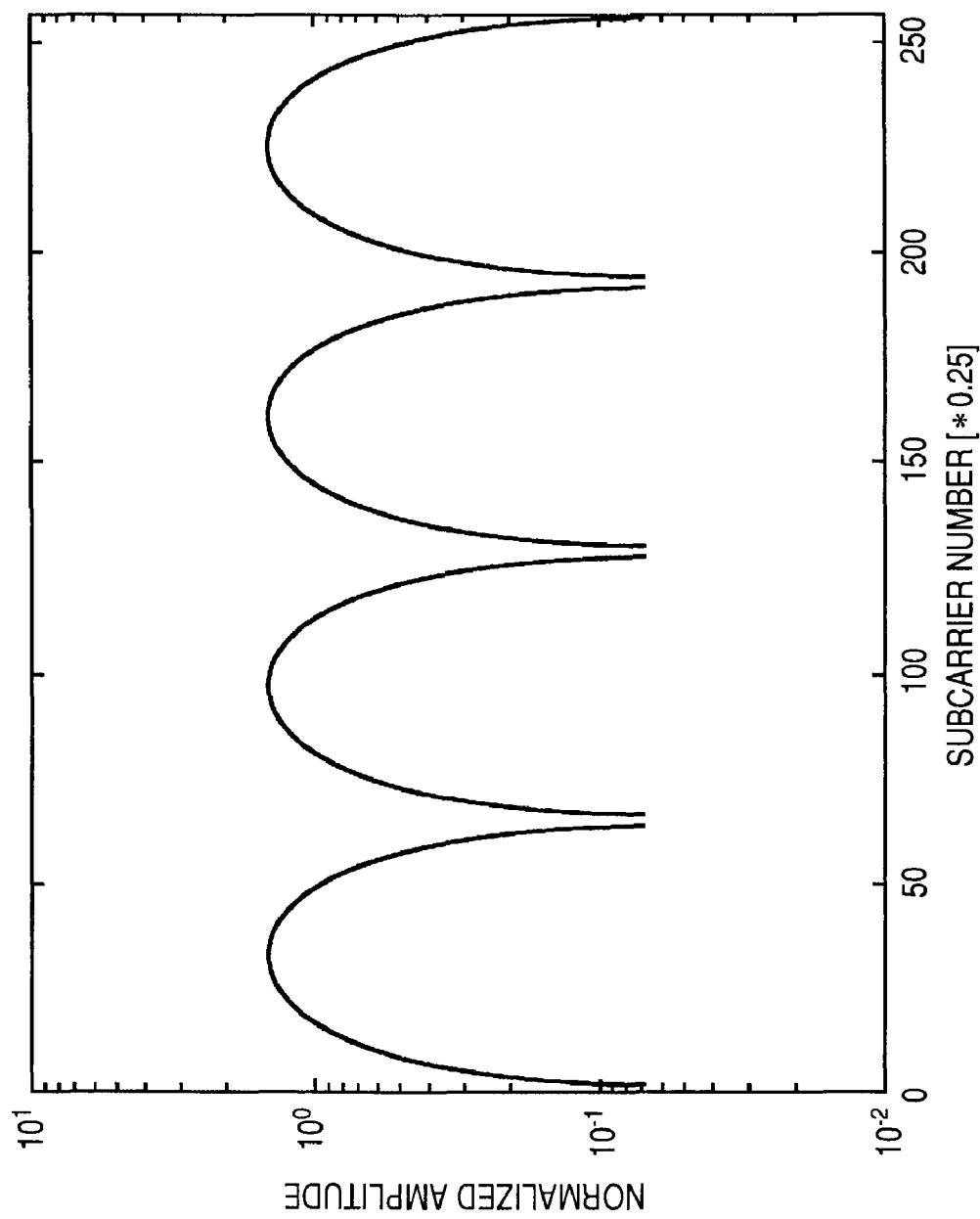
FIG. 18 is a chart showing a frequency response of the channel of the first sample at two samples per symbol.
Figure 19:
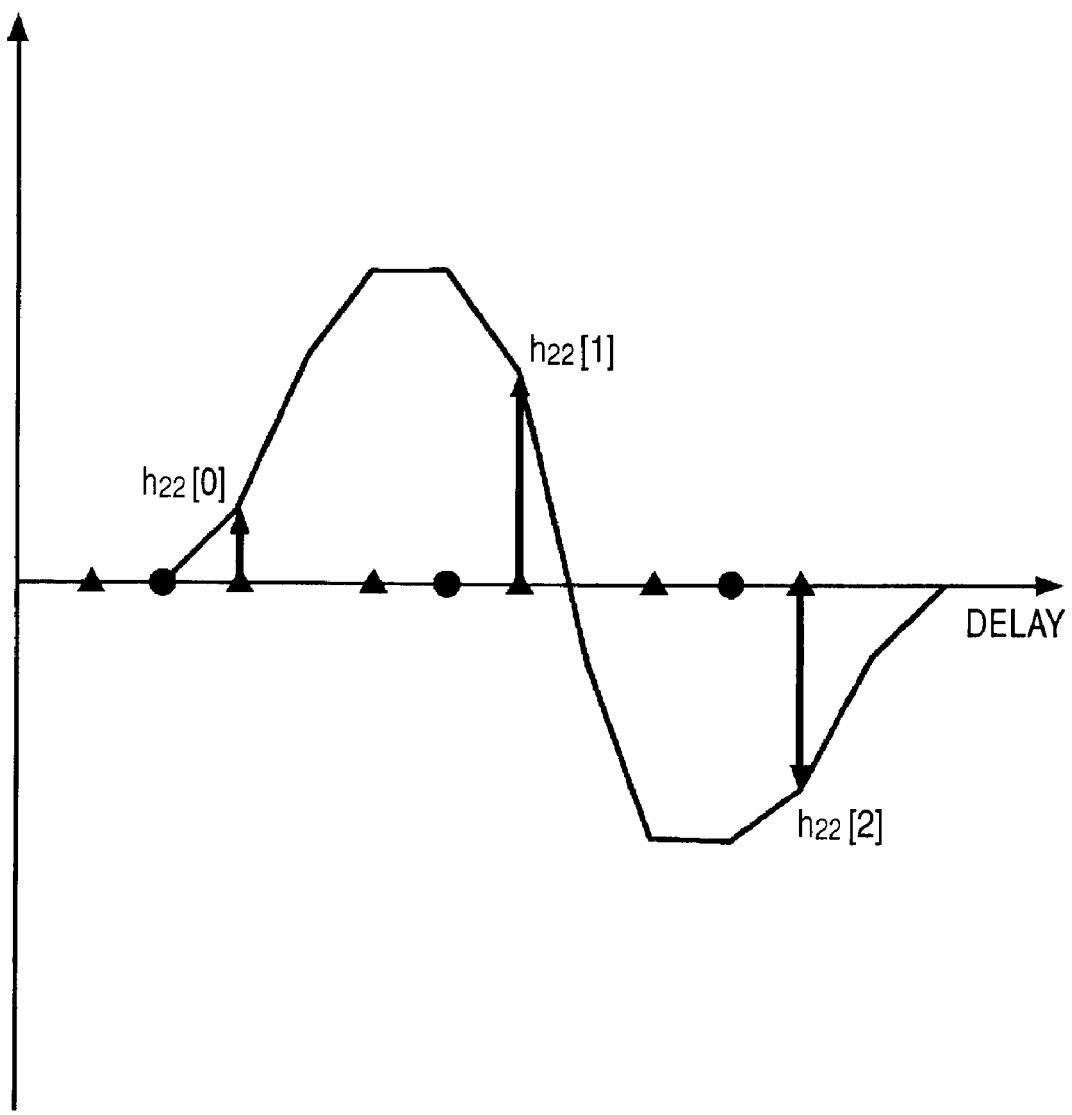
FIG. 19 is a chart showing an impulse response of the channel of the second sample at two samples per symbol.
Figure 20:
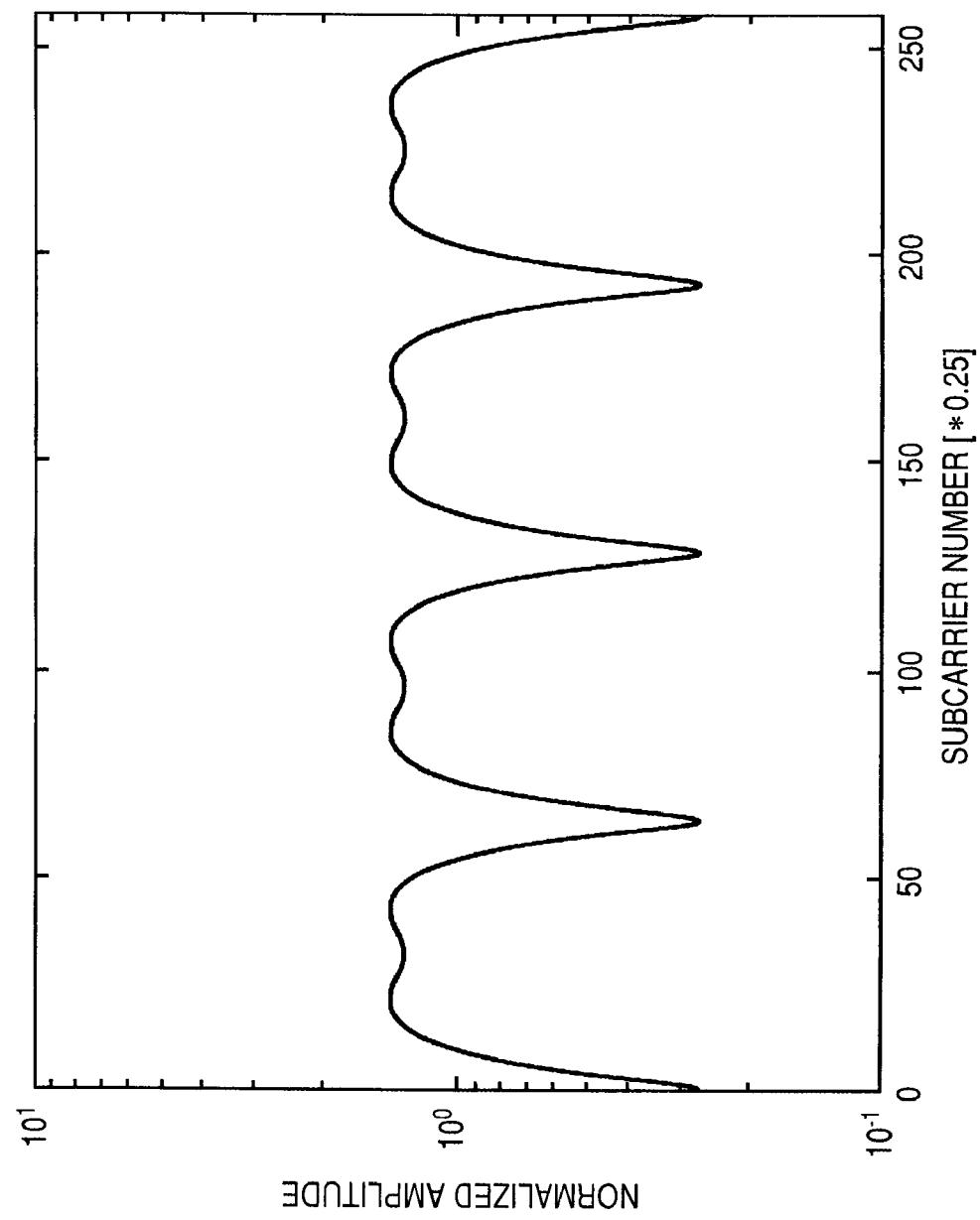
FIG. 20 is a chart showing a frequency response of the channel of the second sample at two samples per symbol.

FIG. 14 shows an example of the channel response when the correlation waveform of the reception signal pulse becomes a triangle. Further, in the case of the example shown in FIG. 14, FIG. 15 shows the impulse response of the channel at one sample per symbol, FIG. 16 shows the frequency response thereof, FIG. 17 shows the impulse response of the channel of the first sample at two samples per symbol, FIG. 18 shows the frequency response thereof, FIG. 19 shows the impulse response of the channel of the second sample at two samples per symbol, and FIG. 20 shows the frequency response thereof. If one symbol includes two samples, the signal is received by combining the frequency responses shown in FIGS. 18 and 20 in a manner of the diversity combination.

In the case in which the null in the frequency response corresponds to a specific subcarrier (e.g., a pilot signal) in FIG. 14, it is possible to switch the rate to two samples per symbol and perform the diversity combination.

For example, if the kth subcarrier is particularly protected and the following formula (24) is satisfied, it is possible to receive the signal by switching the rate from one sample per symbol to two samples per symbol and performing the diversity combination.

$$|H_{11}[k]|^2 < |H_{12}[k]|^2 + |H_{22}[k]|^2 \quad (24)$$

Figure 21:
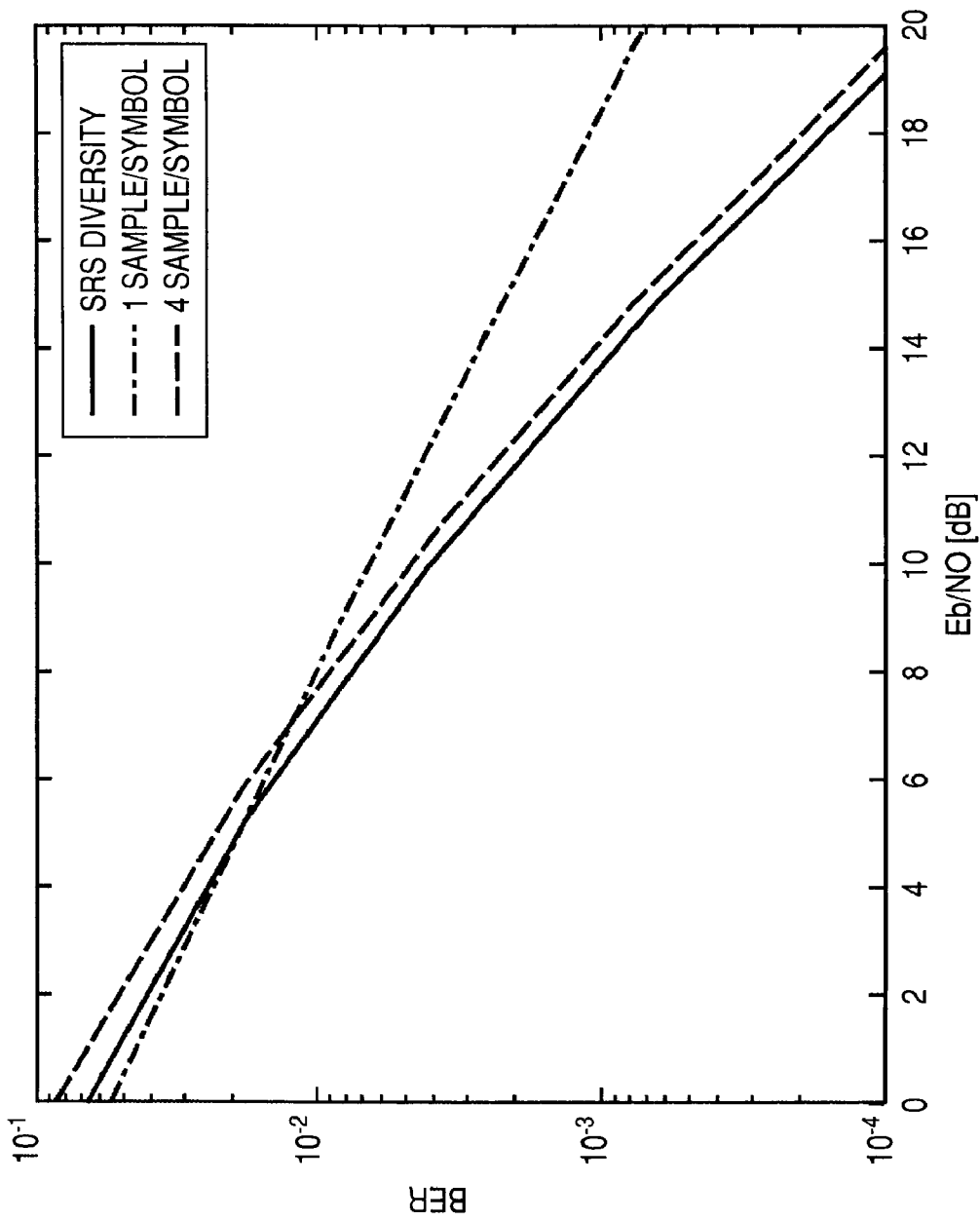
FIG. 21 is a chart for explaining the reception characteristic of an OFDM modulation signal.

FIG. 21 shows the reception characteristic of the OFDM modulation signal composed of 64 subcarriers in the case in which the signal is received at one sample per symbol, in the case in which the signal is received at four samples per symbol, and in the case in which the rate is switched between one sample per symbol and four samples per symbol comparing the evaluation functions to receive at the sampling rate with preferable characteristic (it should be noted that the sampling points are different among one sample per symbol and four samples per symbol. In performing the reception switching one sample per symbol and four samples per symbol from each other, when the reception characteristic shown in FIG. 21 was obtained, the probabilities of performing the sampling once in one symbol and four times in one symbol were 0.55 and 0.45, respectively.

The bit error rate (BER) is independently recorded for each subcarrier, and correlation between subcarriers such as an error correction code is not used. Further, "SRS Diversity" shown in the drawing shows the characteristic when switching between one sample per symbol and four samples per symbol based on the responses of the channel. Further, "1Sample/Symbol" shows the characteristic without using the fractional sampling, while "4Sample/Symbol" shows the characteristic at four samples per symbol and with the fractional sampling performed thereon. Further, it is assumed that four multipath waves for every symbol with different delay amounts and constant intensity come to the receiver, and the delay spread of four symbols duration exists.

When comparing these characteristics, it appears that the case with switching the sampling rate between one sample per symbol between four samples per symbol has the BER which is lower in almost all cases than in the cases in which the signal is received at one sample per symbol or at four samples per symbol. Further, in this case, since the probabilities of sampling one symbol once and of sampling one symbol four times are 0.55 and 0.45, respectively, it can be said that the BER can be reduced while suppressing the amount of signal processing.

Further, in both the DS/SS signal case and the OFDM signal case, as described above, if the sampling points are different among the sampling rates to be switched, the better characteristic can be obtained compared to the case in which the sampling points are the same throughout the sampling rates to be switched.

For example, when the sample rate is switched between one sample per symbol and four samples per symbol, the case in which the sampling point in the rate of one sample per symbol is not the same as any of the sampling points in the rate of four samples per symbol has higher possibility of obtaining as preferable response as possible. In other words, when deciding which one of one sample or four samples per symbol the signal is received at, since the channel response at each sampling point is obtained to operate the evaluation function, if the sampling points do not overlap each other, the probability that the sampling point offering preferable response is included in the sampling points in either sampling rate preferably increases.

In other words, for example, when the sampling rate is switched between one sample per symbol and four samples per symbol, if the sampling point in the rate of one sample per symbol is the same as either one of the sampling points in the rate of four samples per symbol, or when the sampling rate is switched between two samples per symbol and four samples per symbol, if the sampling points in the rate of two samples per symbol are included in the sampling points in the rate of four samples per symbol, the BER characteristic when the sampling rate is switched becomes equal to better one of the BER characteristics of the case in which the switching of the sampling rate is not performed. However, if the sampling points in respective sampling rate are not the same, as shown in FIG. 21, even if compared to the better BER characteristic in the case in which the sampling rate is not switched, the characteristic can be improved in almost all situations.

By thus arranging, the power consumption can be suppressed in comparison with the case in which one symbol is always over-sampled, and better characteristic can be obtained compared to the case in which one symbol is always sampled at one sample per symbol.

Figure 22:
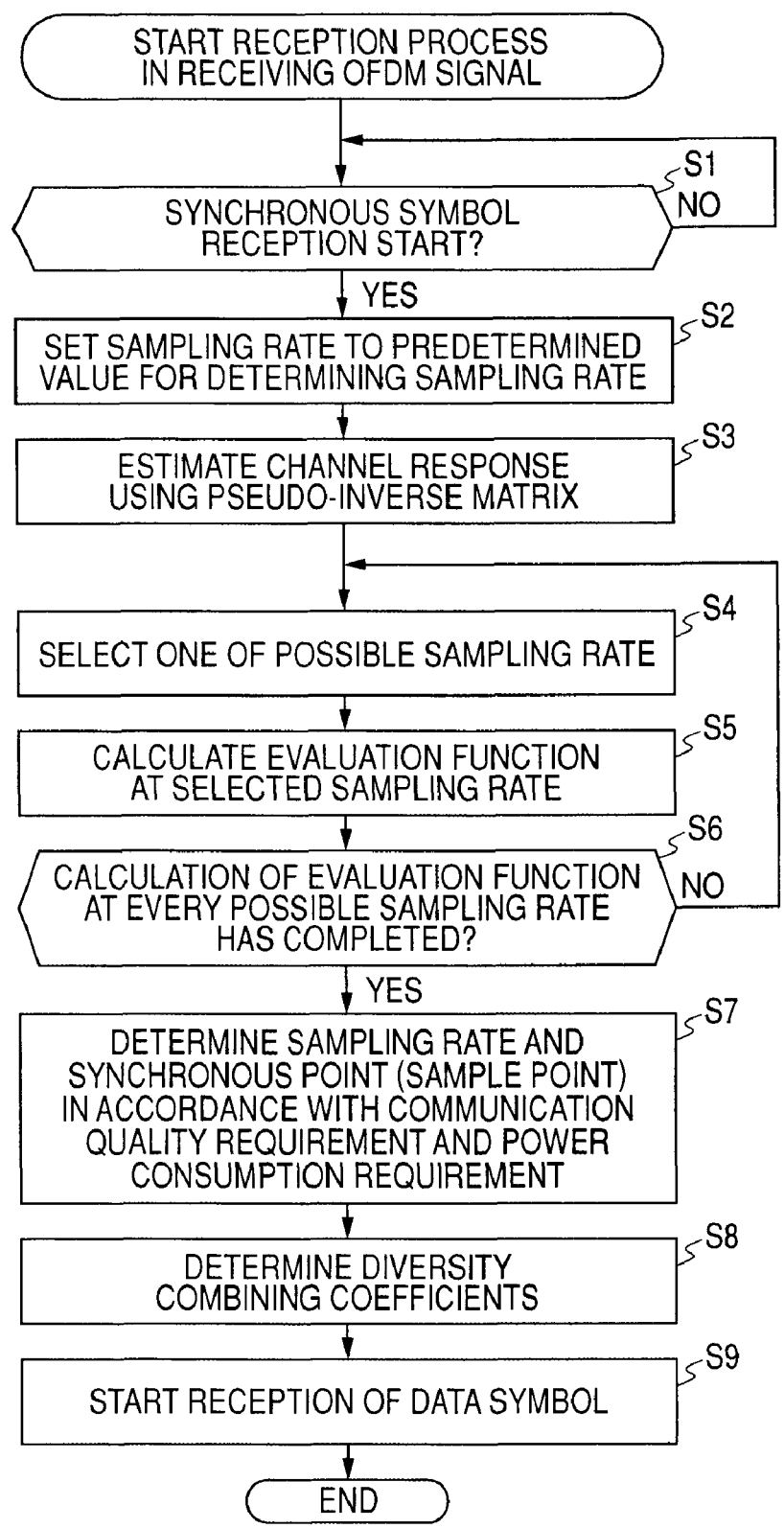
FIG. 22 is a flowchart for explaining the reception process when receiving the OFDM signal.

Then, with reference to the flowchart shown in FIG. 22, the receiving process in receiving the OFDM signal will be explained.

In the step S1, the channel response estimation section 107 judges whether or not reception of the synchronizing symbol is started. If it is judged that the reception of the synchronizing symbol is not started, in the step S1, the process in the step S1 is repeated until it is judged that the reception process is started.

In the step S1, if it is judged that the reception of the synchronizing symbol is started, in the step S2, the sampling rate setting section 155 in the channel response estimation section 107 firstly sets the channel filters 106 so that the sampling is performed at respective sampling points at the available sampling rates, and sets the sampling rate to a predetermined value for determining the sampling rate.

In the step S3, the channel signal acquisition section 151 acquires the channel signal, and the response estimation section 152 estimates the response using the pseudo-inverse matrix, specifically by, for example, operating the formulas (15) and (16), and supplying the evaluation function calculation section 153 with the responses at the sampling points at respective sampling rates obtained by the above estimation.

In the step S4, the evaluation function calculation section 153 selects one of the sampling rates of which the operation of the evaluation function has not been completed.

In the step S5, the evaluation function calculation section 153 calculates the evaluation function at the selected sampling rate using, for example, the above formula (17).

In the step S6, the evaluation function calculation section 153 judges whether or not the calculation of the evaluation function of all available sampling rates has been finished. In the step S6, if it is judged that the calculation of the evaluation function at all of the available sampling rate has not been finished, the process returns to the step S4, and subsequent processes are repeated.

In the step S6, if it is judged that the calculation of the evaluation function at all of the available sampling rate has been completed, in the step S7, the sampling rate determination section 154 determines the sampling rate and synchronous points (the sampling points) in accordance with the requirement of the communication quality and the requirement of the power consumption.

Specifically, for example, in the case in which the communication quality is more important than the power consumption, it is possible that the data reception is performed at a rate of two samples per symbol if the formula (23) or (24) is satisfied, or if the formula (23) or (24) is not satisfied, it is possible to perform the data reception at a rate of one sample per symbol, or if the BER is lower than a predetermined value, the sampling rate is selected in favor of the power consumption, and if the BER is higher than a predetermined value, the sapling rate capable of minimizing the BER can preferably be elected based on the evaluation function.

In the step S8, the demodulation process control section 156 determines the diversity combining coefficient based on the results of the response estimation at the sampling rate thus determined, and controls the combination and demodulation processing section 108 to set the coefficient value.

Then, in the step S9, the channel response estimation section 107 controls the channel filters 106 to set the sampling rate and the sampling points thus determined, and then the sampling of the reception signal is performed to start receiving the data symbol, thus terminating the process.

According to such a process, the power consumption can be suppressed in comparison with the case in which one symbol is always over-sampled, and better reception characteristic can be obtained compared to the case in which one symbol is always sampled at one sample per symbol.

Figure 23:
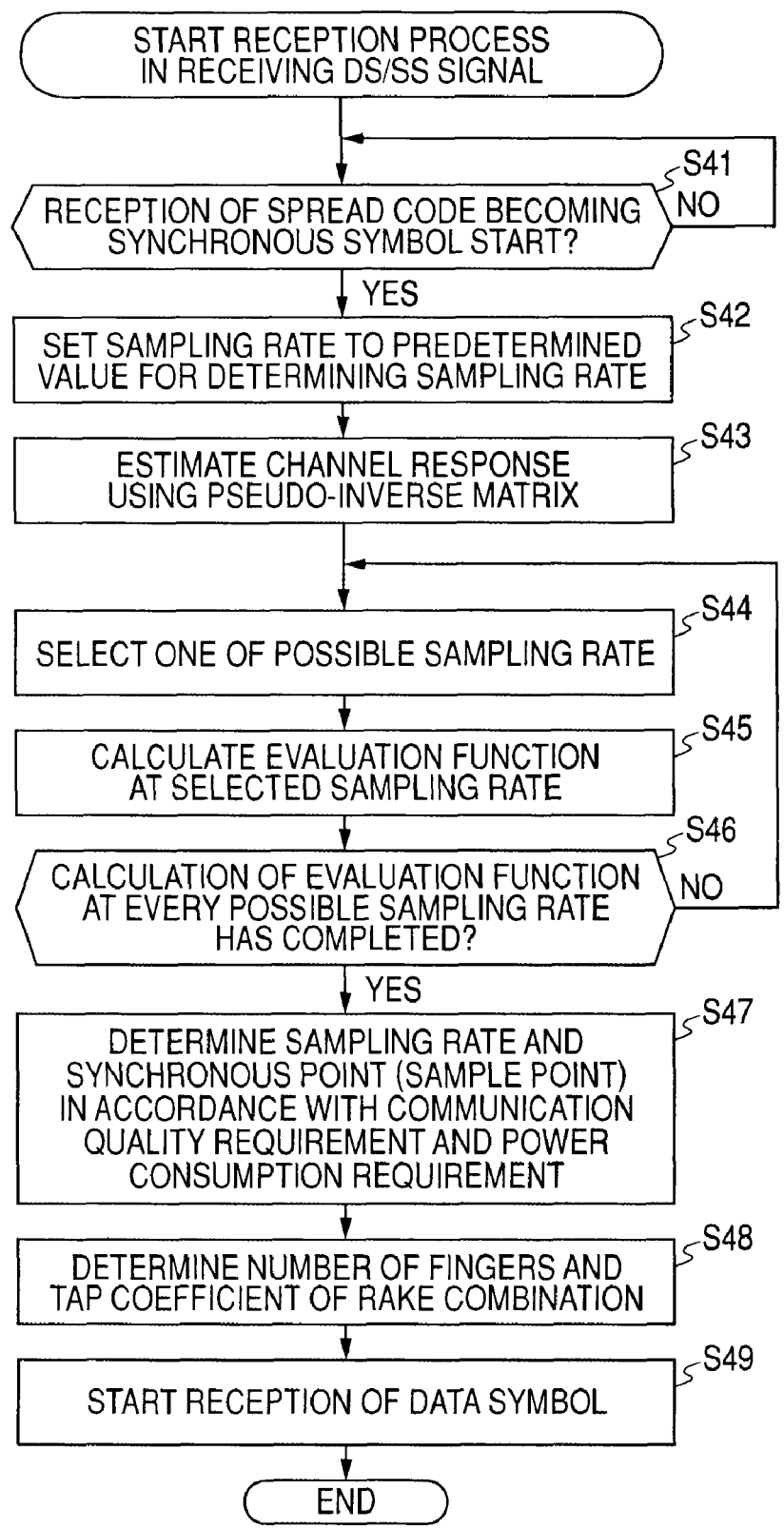
FIG. 23 is a flowchart for explaining the reception process when receiving the DS/SS signal.

Then, with reference to the flowchart shown in FIG. 23, the receiving process in receiving the DS/SS signal will be explained.

In the step S41, the channel response estimation section 107 judges whether or not reception of the spread code to be the synchronizing symbol is started. If it is judged that the reception of the spread code is not started, in the step S41, the process in the step S41 is repeated until it is judged that the reception process is started.

In the step S41, if it is judged that the reception of the spread code is started, in the step S42, the sampling rate setting section 155 in the channel response estimation section 107 firstly sets the channel filters 106 so that the sampling is performed at respective sampling points at the available sampling rates, and sets the sampling rate to a predetermined value for determining the sampling rate.

In the step S43, the channel signal acquisition section 151 acquires the channel signal, and the response estimation section 152 estimates the channel response using the pseudo-inverse matrix, specifically by, for example, operating the formulas (1) through (11), and supplying the evaluation function calculation section 153 with the channel responses at the sampling points at respective sampling rates obtained by the above estimation.

In the step S44, the evaluation function calculation section 153 selects one of the sampling rates of which the operation of the evaluation function has not been completed.

In the step S45, the evaluation function calculation section 153 calculates the evaluation function at the selected sampling rate in a manner shown, for example, in either one side of the above formula (12).

In the step S46, the evaluation function calculation section 153 judges whether or not the calculation of the evaluation function of all available sampling rates has been finished. In the step S46, if it is judged that the calculation of the evaluation function at all of the available sampling rate has not been finished, the process returns to the step S44, and subsequent processes are repeated.

In the step S46, if it is judged that the calculation of the evaluation function at all of the available sampling rate has been completed, in the step S47, the sampling rate determination section 154 determines the sampling rate and synchronous points (the sampling points) in accordance with the requirement of the communication quality and the requirement of the power consumption.

Specifically, for example, in the case in which the communication quality is more important than the power consumption, it is possible that the data reception is performed at a rate of two samples per symbol if the formula (12) is satisfied, or if the formula (12) is not satisfied, it is possible to perform the data reception at a rate of one sample per symbol, or if the BER is lower than a predetermined value, the sampling rate is selected in favor of the power consumption, and if the BER is higher than a predetermined value, the sapling rate capable of minimizing the BER can preferably be elected based on the evaluation function.

In the step S48, based on the results of the response estimation at the determined sampling rate the demodulation process control section 156 determines the number of fingers and the tap coefficient of the RAKE combination, and controls the combination and demodulation processing section 108 to set these values.

Then, in the step S49, the channel response estimation section 107 controls the channel filters 106 to set the sampling rate and the sampling points thus determined, and then the sampling of the reception signal is performed to start receiving the data symbol, thus terminating the process.

According to such a process, the power consumption can be suppressed in comparison with the case in which one symbol is always over-sampled, and better reception characteristic can be obtained compared to the case in which one symbol is always sampled at one sample per symbol.

The series of processes described above can be realized by software. The software is installed by installing the program configuring the software in a computer built in a dedicated hardware, or in a multi-purpose personal computer capable of executing various kinds of functions by installing various kinds of programs from a recording medium. In this case, for example, the receiving device 81 explained with reference to FIG. 4 is configured by the personal computer 301 shown in FIG. 24.

Figure 24:
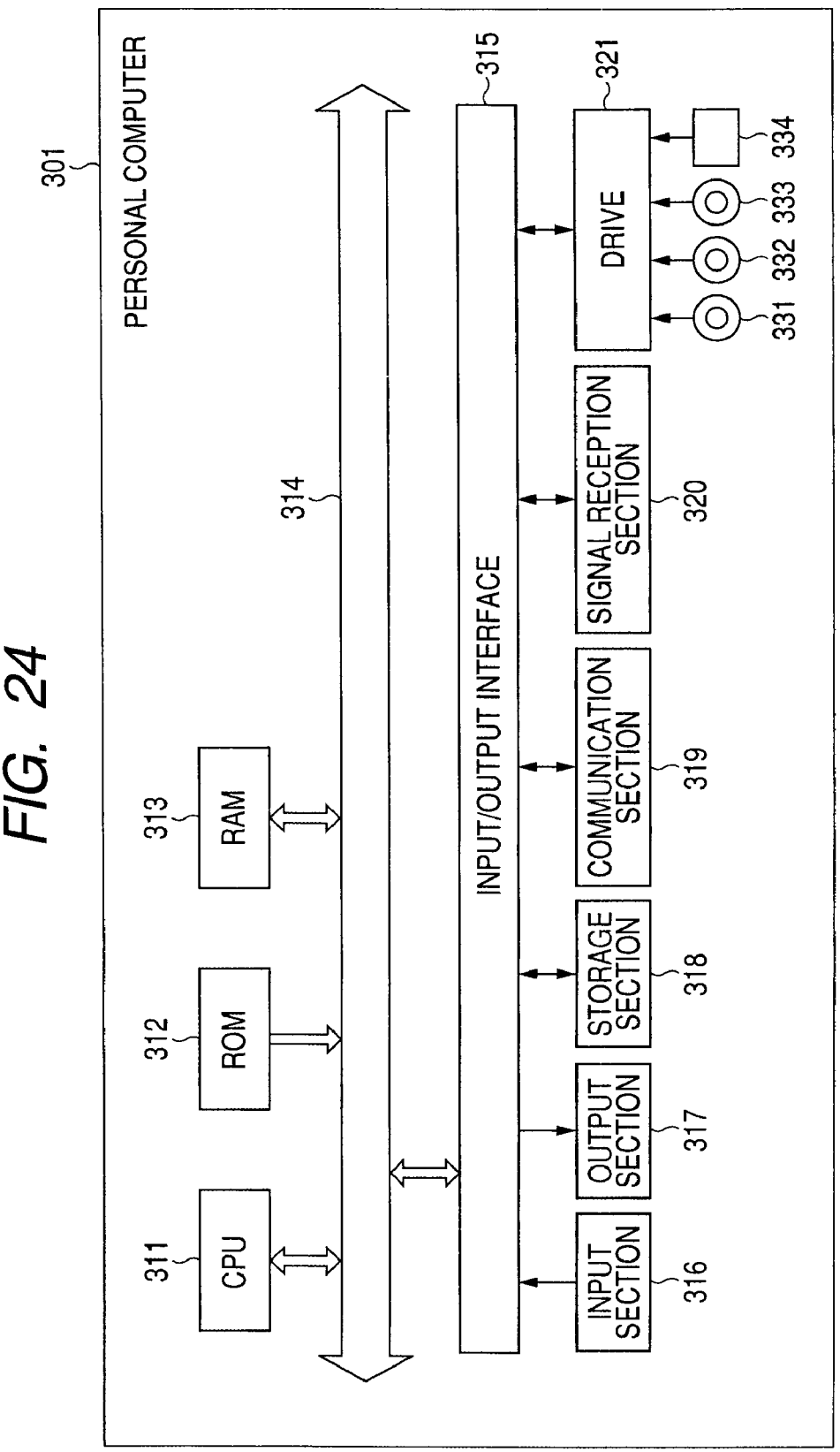
FIG. 24 is a block diagram showing a configuration of a personal computer.

In FIG. 24, a central processing unit (CPU) 311 performs various processes in accordance with a program stored in a read only memory (ROM) 312 or a program loaded to a random access memory (RAM) 313 from a storage section 318. In the RAM 313, there is also stored the data necessary for the CPU 311 to perform the various kinds of processes according to needs.

The CPU 311, the ROM 312, and the RAM 313 are connected to each other via a bus 314. An input/output interface 315 is also connected to the bus 314.

An input section 316 composed of a keyboard, a mouse, and so on, an output section 317 composed of a display, a loud speaker, and so on, a storage section 318 composed of a hard disk and so on, a communication section 319 composed of a modem, a terminal adapter, and so on, and a signal receiving section 320 are connected to the input/output interface 315. The communication section 319 performs a communication process via a network including the Internet.

The signal receiving section 320 is provided with the antenna 101, the BPF 102, the LNA 102, the distribution section 104, the $\Delta\Sigma$AD converter 105, and the channel filters 106 as explained above with reference to FIG. 4, or alternatively, arranged to be able to function similarly, and performs a similar operation to the case described above under the control of the CPU 311 having the function of the channel response estimation section 107 explained above with reference to FIG. 6. Further, the function of the combination and demodulation processing section 108 can be realized by the CPU 311 or by the signal receiving section 320.

The input/output interface 315 is also connected to a drive 321 according to needs, to which a magnetic disk 331, an optical disk 332, a magneto optical disk 333, or a semiconductor memory 334, and so on is loaded as desired, and a computer program readout therefrom is installed in the storage section 318 according to needs.

If the series of processes are executed by the software, the program configuring the software is installed in a computer built in a dedicated hardware, or a multi-purpose personal computer capable of executing various kinds of functions by installing various kinds of programs from the network or the recording medium.

As shown in FIG. 24, the recording medium is composed not only of the package medium distributed separately from the device for delivering programs to the user, including the magnetic disk 331 (including floppy disk), the optical disk 332 (including compact disc read only memory (CD-ROM) and digital versatile disc (DVD)), the magneto optical disk 333 (including mini disc (MD) (registered trademark)), and the semiconductor memory 334 each including the program recorded therein, but also of those distributed to the user in the condition of previously built in the device and mainly composed of the ROM 312 and the hard disk drive included in the storage section 318 each including the program recorded therein.

Further, the steps for describing the program recorded in the recording medium in the specification cover the processes performed in the order of description and in chronological order as a matter of course, and also cover the processes performed in parallel or individually even if they are not necessarily performed in chronological order.

It should be understood by those skilled in the art that various modifications, combinations, sub-combinations, and alterations may occur depending on design requirements and other factors insofar as they are within the scope of the appended claims or the equivalents thereof.

What is claimed is:

1. A receiving device comprising:
channel signal output means for sampling a received signal at a sampling rate switched between a plurality of values in a predetermined range and output a channel signal;
control means for controlling the sampling rate;
response estimation means for estimating a response based on the channel signal;
evaluation means for evaluating a reception characteristic based on the estimated response; and
determination means for determining the sampling rate based on an evaluation of the reception characteristic at a plurality of sampling rates.

2. The receiving device according to claim 1,
wherein in a period for receiving auxiliary information prior to receiving principal information, the auxiliary information being necessary for receiving the principal information;
the sampling rate is controlled to allow the response estimation means to estimate responses at the plurality of sampling rates,
the response estimation means estimates responses at the plurality of sampling rates,
the evaluation means evaluates reception characteristics at the plurality of sampling rates, and
the determination means determines a practical sampling rate for sampling a signal corresponding to the principal information in the channel signal output means based on the evaluation of the reception characteristics at the plurality of sampling rates by the evaluation means, and
wherein, in a period for receiving the principal information,
the control means controls the sampling rate to be a practical sampling rate.

3. The receiving device according to claim 2,
wherein, when sampling the received signal, sampling points in the plurality of sampling rates are different.

4. The receiving device according to claim 1,
wherein the channel signal output means includes
analogue-to-digital (A/D) conversion means for oversampling the received signal and converting the received into a digital signal, and
rate conversion means for converting a rate of the digital signal obtained by converted by the A/D conversion means and outputting the channel signal with the sampling rate controlled by the control means.

5. The receiving device according to claim 1, further comprising:
demodulation means for demodulating the received signal based on the response estimated by the response estimation means.

6. The receiving device according to claim 5, further comprising:
combination control means for controlling the number of fingers and a tap coefficient of a RAKE combination based on the response estimated by the response estimation means.

7. The receiving device according to claim 5, further comprising:
combination control means for controlling a diversity combining coefficient based on the response estimated by the response estimation means.

8. A receiving method for a receiving device for receiving a signal, comprising:
prior to receiving principal information, and in a period for receiving a signal corresponding to auxiliary information necessary for receiving the principal information,
sampling the signal corresponding to the auxiliary information at a sampling rate controlled so that an estimation of responses at a plurality of sampling rates is allowed;
estimating responses at the plurality of sampling rates;
evaluating reception characteristics at the plurality of sampling rates based on the estimated responses;
determining a practical sampling rate for sampling a signal corresponding to the principal information based on the evaluation of the reception characteristics at the plurality of sampling rates;
in a period for receiving the signal corresponding to the principal information,
controlling the sampling rate for sampling the signal corresponding to the principal information to be the practical sampling rate; and
sampling the signal corresponding to the principal information at the practical sampling rate.

9. A non-transitory computer-readable medium encoded with a computer executable program for allowing a computer to control a process of a received signal, the process including the steps of:

controlling a sampling rate to allow an estimation of responses at a plurality of sampling rates;

estimating responses at the plurality of sampling rates;

evaluating reception characteristics at the plurality of sampling rates based on the estimated responses;

determining a practical sampling rate for sampling a signal corresponding to the principal information based on the evaluation of the reception characteristics at the plurality of sampling rates; and controlling the sampling rate for sampling the signal corresponding to the principal information to be the practical sampling rate.

10. A receiving device comprising:

a channel signal output section sampling a received signal at a sampling rate switched between a plurality of values in a predetermined range and outputting a channel signal;

a controller controlling the sampling rate in the channel signal output section;

a response estimator estimating a response based on the channel signal;

an evaluator evaluating a reception characteristic based on an estimation result of the response by the response estimator; and a determination section determining the sampling rate based on an evaluation of the reception characteristic at a plurality of sampling rates.

* * * * *